US012306707B2

United States Patent
Verma et al.

(10) Patent No.: US 12,306,707 B2
(45) Date of Patent: May 20, 2025

(54) PRIORITIZED FAULT REMEDIATION

(71) Applicant: INTERNATIONAL BUSINESS MACHINES CORPORATION, Armonk, NY (US)

(72) Inventors: Mudit Verma, New Delhi (IN); Pooja Aggarwal, Bengaluru (IN); Padmanabha Venkatagiri Seshadri, Mysore (IN); Rama Kalyani T. Akkiraju, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/159,129

(22) Filed: Jan. 25, 2023

(65) Prior Publication Data
US 2024/0248790 A1    Jul. 25, 2024

(51) Int. Cl.
G06F 11/00    (2006.01)
G06F 11/07    (2006.01)
G06N 5/022    (2023.01)

(52) U.S. Cl.
CPC ...... *G06F 11/0793* (2013.01); *G06F 11/0709* (2013.01); *G06N 5/022* (2013.01)

(58) Field of Classification Search
CPC .. G06F 11/0793; G06F 11/0709; G06N 5/022
See application file for complete search history.

(56) References Cited

U.S. PATENT DOCUMENTS

| 7,043,403 B1 * | 5/2006 | Wang | G05B 23/024 |
| | | | 702/182 |
| 11,204,824 B1 * | 12/2021 | Tiwari | G06F 11/0793 |
| 2010/0318837 A1 * | 12/2010 | Murphy | G06F 11/1461 |
| | | | 714/E11.125 |

(Continued)

FOREIGN PATENT DOCUMENTS

WO    WO2021186291 A1    3/2020

OTHER PUBLICATIONS

Shetty, Jyoti et al.; Proactive cloud service assurance framework for fault remediation in cloud environment; International Journal of Electrical and Computer Engineering, vol. 10, No. 1; Feb. 2020; pp. 987-996.

(Continued)

*Primary Examiner* — Jason B Bryan
(74) *Attorney, Agent, or Firm* — Nicholas A. Welling, Esq.; Heslin Rothenberg Farley & Mesiti P.C.; George S. Blasiak, Esq.

(57) ABSTRACT

Methods, computer program products, and systems are presented. The method computer program products, and systems can include, for instance: iteratively examining logging data; detecting multiple faults in a computer environment in dependence on the examining of the logging data; generating for respective ones of the detected multiple faults one or more candidate remediation to provide a set of candidate remediations for the computer environment; prioritizing remediations defining the set of candidate remediations from the generating and ordering the remediations in a remediation queue according to an order of the prioritizing; and deploying remediations according to the ordering of remediations in the remediation queue.

19 Claims, 11 Drawing Sheets

(56) References Cited

U.S. PATENT DOCUMENTS

| | | | |
|---|---|---|---|
| 2022/0382620 A1* | 12/2022 | Bramble | G06F 11/0706 |
| 2023/0045896 A1* | 2/2023 | Malik | G06F 9/5077 |
| 2023/0229548 A1* | 7/2023 | Harutyunyan | G06F 11/079 |
| | | | 714/47.2 |

OTHER PUBLICATIONS

Forsberg, Viktor; Automatic Anomaly Detection and Root Cause Analysis for Microservice Clusters; Master Thesis, UMEA University; 2019; 46 pages.

Huang, Song et al.; Differentiated Failure Remediation with Action Selection for Resilient Computing; 21st Pacific Rim International Symposium on Dependable Computing; Nov. 2015; 10 pages.

Wu, Li et al.; MicroRAS: Automatic Recovery in the Absence of Historical Failure Data for Microservice Systems; 13th IEEE/ACM International Conference on Utility and Cloud Computing, Dec. 2020; 11 pages.

Baboi, Mihai et al.; Dynamic Microservices to Create Scalable and Fault Tolerance Architecture; 23rd International Conference on Knowledge-Based and Intelligent Information & Engineering; Jan. 2019; pp. 1035-1044.

Dhunna, Saurabh et al.; Observability and AIOps: The complete closed-loop automation for incident management; digitate.com; retrieved from the Internet May 29, 2022; 7 pages.

Yousef, Nabeel; Framework for Cost Modeling a Supply Chain; STARS University of Central Florida; Electronic Theses and Dissertations, 2002-2019; 2006; 269 pages.

Fault Diagnosis; https://pld.ttu.ee/diagnostika/theory/faultdiagnosis.html; retrieved from the Internet Dec. 20, 22; 8 pages.

C. Wohlin et al.; Software Faults: Spreading, Detection and Costs, Software Engineering Journal, vol. 5, No. 1; Jan. 1990; pp. 33-42.

* cited by examiner

PRIORITIZED FAULT REMEDIATION

BACKGROUND

Embodiments herein relate generally to fault remediation and specifically to prioritization of fault remediation.

The cloud computing model has emerged as the de facto paradigm for providing a wide range of services in the IT industry such as infrastructure, platform, and application services. As a result, various vendors offer cloud-based solutions to optimize the use of their data centers. Modern cloud-based applications, irrespective of scale, are distributed, heterogeneous and can evolve rapidly in a matter of hours to respond to user feedback. This agility is enabled by the use of a fine-grained service-oriented architecture, referred to as a microservice architecture. A microservice is a web service that serves a single purpose, and exposes a set of APIs to other microservices, which collectively implement a given application. Each microservice of a microservice-based application is developed, deployed and managed independent of other constituent microservices of the microservice-based application. New features and updates to a microservice are continuously delivered in a rapid, incremental fashion, wherein newer versions of microservices are continually integrated into a production deployment. Microservice-based applications developed in this manner are extremely dynamic as they can be updated and deployed hundreds of times a day.

A microservices architecture structures a software application as a collection of loosely coupled services. In microservices architecture, services are generally fine-grained and the protocols are lightweight. One benefit of decomposing an application into different smaller services is that it improves modularity and makes the application easier to understand, develop and test. Additionally, microservices architecture enables autonomous development teams to develop, deploy and scale their respective services (microservices) independently. In microservices architecture, each microservice (i.e., subsystem) can be used by different applications. A microservice architecture is a method of developing software systems that enables support for a range of platforms and devices, including but not limited to, web-enables devices, mobile devices, Internet of Things (IoT) devices, and wearables. Because of this cross-platform and cross-device flexibility, this architecture is often utilized in shared computing systems and distributed systems, including in cloud computing systems. A microservice architecture provides a method for developing software applications, which are also referred to herein as information services, as suites of independently deployable, small, modular services, in which each service runs a unique process and communicates through a well-defined, lightweight, mechanism to serve a defined goal. Thus, a microservice architecture can be utilized to deploy multiple services that work together as a unique application. In this architecture, the overall versioning is represented by the sum of the single service code version. The multiplicity of the services provides a cohesive software solution across devices and platforms.

Microservices can communicate with one another with use of application programming interfaces (APIs). An API can refer to a set of routines, protocols, and tools for building software applications. An application programming interface makes it easier to develop a software application by providing all the basic building blocks. An application developer then puts the building blocks together to create a software application. In essence, an application's application program interface defines the proper way for the developer to request services from that application. Documentation for the application programming interface is usually provided to facilitate usage of the application programming interface. An endpoint is one end of a communication channel. When an API interacts with another system, the touchpoints of this communication are considered endpoints. For APIs, an endpoint can include a URL of a server or service. Each endpoint is the location from which APIs can access the resources they need to carry out their function. APIs work using 'requests' and 'responses.' When an API requests information from a web application or web server, it will receive a response. The place that APIs send requests and where the resource lives, is called an API endpoint. Microservice API endpoints can employ use of a microservice message bus.

Popular highly available Internet services (which are implemented as a microservice-based application) have experienced failures and outages (e.g., cascading failures due to message bus overload, cascading failures due to database overload, cascading failures due to degradation of core internal services, database failures, etc.).

US Publication 20220179763A1 sets forth techniques that include collecting current logs from distributed sources, selecting a group of the current logs that are from a related source of the distributed sources, and generating a feature vector using the group of the current logs. A current status model is created for the feature vector using the group of the current logs. One or more anomalies are determined in the group of the current logs based on a difference between the current status model and a reference status model, the reference status model being based on history logs.

US Publication 20220067627A1 sets forth a method, system, and computer program product are provided for key performance indicator (KPI) extraction. A baseline value and times series data are received. The time series data includes logs, performance data, and operational data from one or more servers. The time series data is embedded to a vector. A multi-tier list of key KPI values is created. The key KPI value having a least cumulative absolute error is identified.

US Publication 20220067627A1 sets forth a computer-implemented method, a computer program product, and a computer system for stochastic event triage. A computer receives an event log including timestamps and event types. The computer determines a sparse impact matrix representing causal relationships between the event types, via a cardinality regularization. The computer determines triggering probabilities representing causal association probabilities between individual event instances, by leveraging a variational bound of a likelihood function. The computer provides a user with the triggering probabilities for event triage. The computer learns model parameters by iterating type-level causal analysis and instance-level causal analysis.

Data structures have been employed for improving operation of computer system. A data structure refers to an organization of data in a computer environment for improved computer system operation. Data structure types include containers, lists, stacks, queues, tables and graphs. Data structures have been employed for improved computer system operation, e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: Methods, computer program products, and systems are presented. The method computer program products, and systems can include, for instance: iteratively examining logging data; detecting multiple faults in a computer environment in dependence on the examining of the logging data; generating for respective ones of the detected multiple faults one or more candidate remediation to provide a set of candidate remediations for the computer environment; prioritizing remediations defining the set of candidate remediations from the generating and ordering the remediations in a remediation queue according to an order of the prioritizing; and deploying remediations according to the ordering of remediations in the remediation queue.

In another aspect, a computer program product can be provided. The computer program product can include a computer readable storage medium readable by one or more processing circuit and storing instructions for execution by one or more processor for performing a method. The method can include, for example: iteratively examining logging data; detecting multiple faults in a computer environment in dependence on the examining of the logging data; generating for respective ones of the detected multiple faults one or more candidate remediation to provide a set of candidate remediations for the computer environment; prioritizing remediations defining the set of candidate remediations from the generating and ordering the remediations in a remediation queue according to an order of the prioritizing; and deploying remediations according to the ordering of remediations in the remediation queue.

In a further aspect, a system can be provided. The system can include, for example a memory. In addition, the system can include one or more processor in communication with the memory. Further, the system can include program instructions executable by the one or more processor via the memory to perform a method. The method can include, for example: iteratively examining logging data; detecting multiple faults in a computer environment in dependence on the examining of the logging data; generating for respective ones of the detected multiple faults one or more candidate remediation to provide a set of candidate remediations for the computer environment; prioritizing remediations defining the set of candidate remediations from the generating and ordering the remediations in a remediation queue according to an order of the prioritizing; and deploying remediations according to the ordering of remediations in the remediation queue.

Methods, system, and computer program products are set forth herein wherein there is performed: iteratively examining logging data; detecting multiple faults in a computer environment in dependence on the examining of the logging data; generating for respective ones of the detected multiple faults one or more candidate remediation to provide a set of candidate remediations for the computer environment; prioritizing remediations defining the set of candidate remediations from the generating and ordering the remediations defining the set of candidate remediations in a remediation queue according to an order of the prioritizing; and deploying fault remediations according to the ordering of the remediations defining the set of candidate remediations in the remediation queue, wherein the prioritizing the candidate remediations is performed in dependence on a predicted impact of a certain fault of the detected multiple faults, wherein predicting an impact of the certain fault is in dependence on historical data that comprises key performance indicator (KPI) dataset that specifies KPI changes of a certain microservice through a time window of a certain historical fault.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
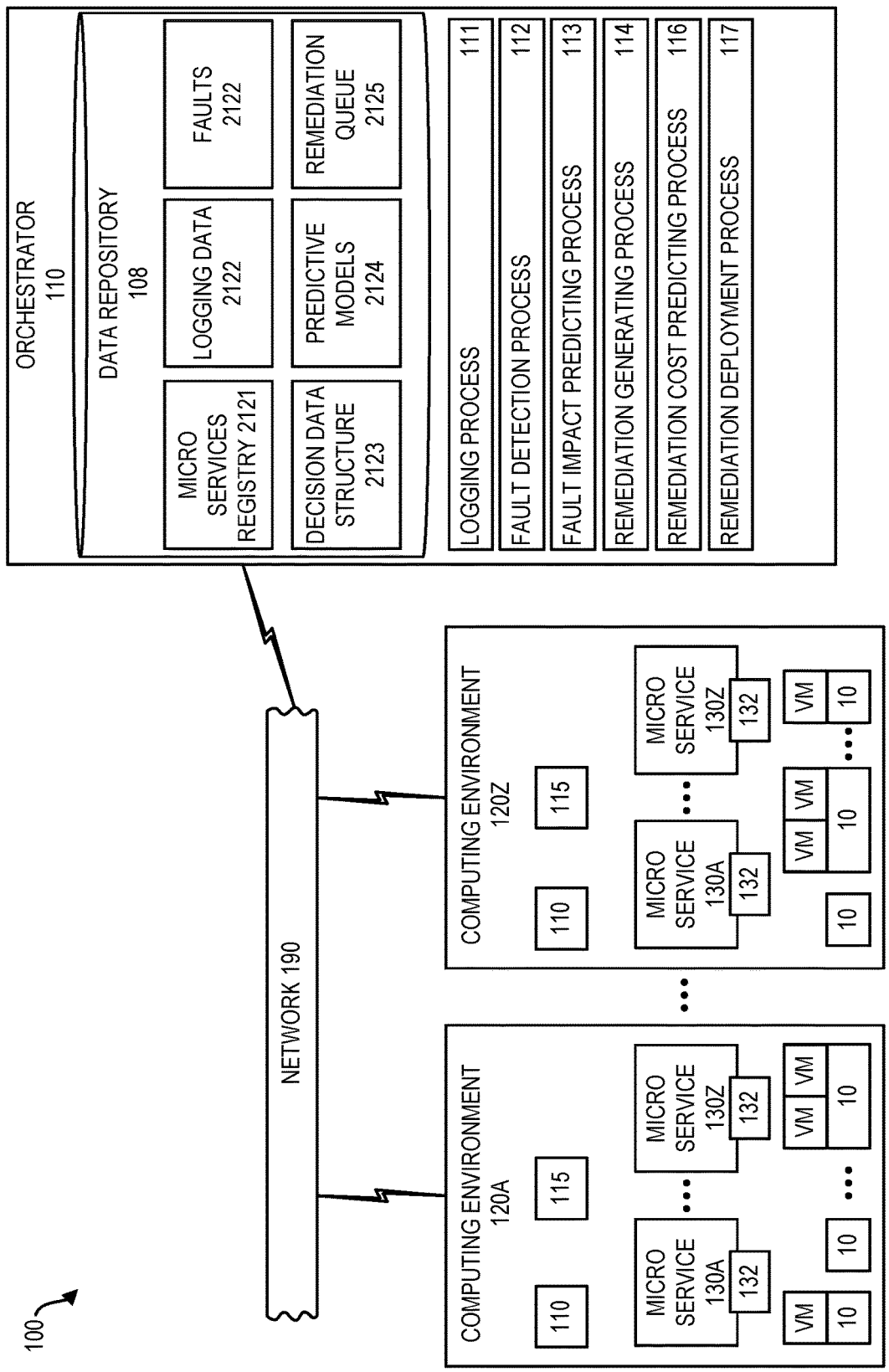
FIG. 1 depicts a system comprising an orchestrator and the plurality of computer environments according to one embodiment.

System 100 for use in remediating faults in a computer environment is shown in FIG. 1. System 100 in one embodiment can include a plurality of computer environments 120A to 120Z and orchestrator 110. Computer environments 120A to 120Z and orchestrator 110 can be in communication via network 190. System 100 can include numerous devices which can be computing node based devices connected by network 190. Network 190 can be a physical network and/or a virtual network.

A physical network can include, for example, a physical telecommunications network connecting numerous computing nodes such as computer servers and computer clients. A virtual network can, for example, combine numerous physical networks or parts thereof into a logical virtual network. In another example, numerous virtual networks can be defined over a single physical network.

Orchestrator 110 can be provisioned to detect faults in computer environments 120A to 120Z and to remediate such faults in dependence on a prioritization of faults.

Embodiments herein recognize that when an application is defined by a plurality of microservices, e.g., tens, hundreds or even thousands of microservices, faults can be experienced in multiple different microservices concurrently and simultaneously. Embodiments herein permit prioritization so that remediation of the experienced faults is performed in dependence on fault impact and remediation cost. Embodiments herein recognize that commerce applications such an online shopping platform, or a video streaming service, can comprise tens to thousands of microservices. Each of these application might consist of many sub parts, e.g., user-database, content database, User Interface, purchase module, product catalogue, search, authentication and authorization, and the like. In one embodiment, each of these component (microservices or simply components) have a specific function, e.g. a user database can contains all user information, a purchase module deals with purchases of plans/products. All these components acting together for the consolidated application. As of definition, a large scale application, may consist of multiple sub-components each provided by a microservice. These components interact with each and forms the larger application service.

Embodiments herein can provide for fault detection in a computer environment, generation of candidate remediations for such faults and prioritization of the generated candidate remediations. Embodiments herein recognize that there can be limited resources with which to perform remediations. Remediation resources can include, e.g., compute resources for remediation, memory resources for remediation, remediation service resources. Accordingly, prioritization of remediations can produce advantages in terms of conservation of limited remediation resources.

Orchestrator 110 in one embodiment can be external to computer environments 120A to 120Z. In another embodiment, orchestrator 110 can be co-located within one or more computer environment of computer environments 120A to 120Z as is indicated by orchestrator 110 located in computer environments 120A to 120Z.

Respective computer environments 120A-120Z can include various computing nodes, e.g., which can include computing nodes 10 provided by physical computing nodes and/or virtual machines, VMs, running on physical computing nodes 10. In one embodiment, respective computer environments 120A-120Z can include one or more microservices such as microservices 130A-130Z. In one embodiment, a collection of one or more microservice can define a service application. Embodiments herein recognize that in some instances a service application can be provided with use of multiple, e.g., tens, hundreds of thousands of microservices. Respective computer environments 120A-120Z can include respective managers 115. A manager 115 of a computer environment can manage microservices 130A-130Z of its associated computer environment.

A microservices architecture structures a service application as a collection of loosely coupled services. In microservices architecture, services are generally fine-grained and the protocols are lightweight. One benefit of decomposing an application into different smaller services is that it improves modularity and makes the application easier to understand, develop and test. Additionally, microservices architecture enables autonomous development teams to develop, deploy and scale their respective services (microservices) independently. In microservices architecture, each microservice (i.e., subsystem) can be used by different applications. A microservice architecture is a method of developing software systems that enables support for a range of platforms and devices, including but not limited to, web-enables devices, mobile devices, Internet of Things (IoT) devices, and wearables. Because of this cross-platform and cross-device flexibility, this architecture is often utilized in shared computing systems and distributed systems, including in cloud computing systems. A microservice architecture provides a method for developing software applications, which are also referred to herein as information services, as suites of independently deployable, small, modular services, in which each service runs a unique process and communicates through a well-defined, lightweight, mechanism to serve a defined goal. Thus, a microservice architecture can be utilized to deploy multiple services that work together as a unique application. In this architecture, the overall versioning is represented by the sum of the single service code version. The multiplicity of the microservices provides a cohesive software solution across devices and platforms.

Microservices can communicate with one another with use of application programming interfaces (APIs). An API can refer to a set of routines, protocols, and tools for building software applications. An application programming interface makes it easier to develop a software application by providing all the basic building blocks. An application developer then puts the building blocks together to create a software application. In essence, an application's application program interface defines the proper way for the developer to request services from that application. Documentation for the application programming interface is usually provided to facilitate usage of the application programming interface. An endpoint is one end of a communication channel. When an API interacts with another system, the touchpoints of this communication are considered endpoints. For APIs, an endpoint can include a URL of a server or service. Each endpoint is the location from which APIs can access the resources they need to carry out their function. APIs work using 'requests' and 'responses.' When an API requests information from a web application or web server, it will receive a response. The place that APIs send requests and where the resource lives, is called an API endpoint. Microservice API endpoints can employ use of a microservice message bus.

Referring again to computer environments 120A-120Z, respective microservices 130A-130Z can include one or more addressable API endpoint 132. Logging data sent from a microservice can be tagged with an address of an API endpoint 132 so that a location of a resource associated to sent logging data can be identified.

Orchestrator 110 can include data repository 108 and can run various processes. Data repository 108 in microservices registry 2121 can store data specifying attributes of microservices of system 100. Microservices data can include, e.g., type or classification of microservice resource, number of computing nodes 10 provided by physical computing nodes, resource allocations, e.g., CPU and memory, public methods lists, and the like. For a given microservice, microservices registry 2121 can include a history of revisions to a microservice.

Data repository 108 in logging data area 2122 can include time series logging data for the various microservices of system 100. Logging data can include logging data from logging agents, e.g., disposed on system hardware, e.g., computing nodes 10 provided by physical computing nodes, system-level software, e.g., at a hypervisor level and/or logging agents in an application layer.

Data repository 108 and faults area 2122 can include data specifying detected multiple faults detected by orchestrator 110. Orchestrator 110 as set forth herein can detect faults by way of examining logging data. Examples of detected multiple faults can include, e.g., threshold exceeding CPU loading, server error, insufficient memory and the like.

Data repository 108 in decision data structure area 2123 can store decision data structures for use in return of action decisions by orchestrator 110.

Data repository 108 in predictive models area 2124 can store predictive models. Predictive models can be trained with use of training data for return of action decisions by orchestrator 110.

Data repository 108 in remediation queue 2125 can store identifiers for remediations that can be performed by orchestrator 110 within a respective computer environment being serviced by orchestrator 110. The remediation queue defines an ordering for performance of remediations that can be performed by orchestrator 110. According to embodiments herein, orchestrator 110 can dynamically change an ordering of remediations for performance with respect to a computer environment that are specified in remediation queue 2125.

Orchestrator 110 can run various processes. Orchestrator 110 running logging process 111 can obtain logging data. Logging data can include, e.g., logging data from hardware level agents, system software level agents and/or application layer logging agents. Logging data obtained by logging process 111 can include time series logging data.

Orchestrator 110 running fault detection process 112 can include orchestrator 110 examining logging data produced by logging process 111 for return of fault detection events. Orchestrator 110 running fault detection process can include orchestrator 110 performing fault detection with use of an artificial intelligence for IT operations (AIOPs). AIOps (Artificial Intelligence for IT operations) refers to the application of artificial intelligence (AI) to enhance IT operations. Use of AIOps can automate and manage IT operations (processes) and infrastructure (application).

Orchestrator 110 running fault impact predicting process 113 can include orchestrator 110 examining historical data, e.g., historical data in faults area 2122. Orchestrator 110 can be configured so that when a fault is detected, orchestrator 110 commences recordation of an audit trail record of the fault, which audit trail record can be stored in faults area 2122. Orchestrator 110 running fault impact predicting process 113 can examine a plurality of factors. Factors considered can include, e.g., number of infrastructure components defining system resources impacted, the extent of the failure, e.g., partial or transient and/or key performance indicator degradations (KPIs).

Orchestrator 110 running remediation generating process 114 can include orchestrator 110 generating one or more candidate remediations for respective faults detected by orchestrator 110 running fault detection process 112. Orchestrator 110 running the remediation generating process 114 can include orchestrator 110 running clustering analysis to ascertain historical faults matching a current fault. In one aspect, orchestrator 110 can examine parameters defining a current fault with respect to multidimensional parameters defining historical faults and can identify historical faults having a threshold level of similarity with respect to the current fault, e.g., based on threshold satisfying Euclidian distance.

Orchestrator 110 running remediation generating process 114 can include orchestrator 110 examining historical data of faults area 2122 for audit trail data respecting the performance of remediations implemented with respect to the historical faults. Remediations having a success metric below a threshold can be removed from a list of candidate remediations for a current fault.

Orchestrator 110 running remediation cost predicting process 116 can include orchestrator 110 performing cost predicting with respect to candidate remediations identified by remediation generating process 114. Orchestrator 110 running remediation cost predicting process 116 can include orchestrator 110 examining plurality of factors for determination of costs associated with candidate remediation. Orchestrator 110 running remediation cost predicting process 116 can include orchestrator 110 examining a plurality of factors. In one aspect, orchestrator 110 running remediation cost predicting process can include orchestrator 110 examining classification of a fault, e.g., classification of a remediation, e.g., software related remediation or hardware related remediation. Orchestrator 110 running remediation cost predicting process 116 can include orchestrator 110 using a decision data structure that maps base costs of the remediation that maps classifications of remediations to base costs for remediations. Orchestrator 110 running remediation cost predicting process can include orchestrator 110 also examining remediation complexity. Orchestrator 110 determining complexity of a remediation can include orchestrator 110 determining, e.g., number of steps involved to implement a remediation, time taken to perform each of the steps of a remediation, skills required to perform remediation steps and the like.

Orchestrator 110 running remediation deployment process 117 can include orchestrator 110 prioritizing remediations for implementation in a computer environment. Embodiments herein recognize that there can be limited resources with which to perform remediations. Remediation resources can include, e.g., compute resources for remediation, memory resources for remediation, remediation service resources. Accordingly, prioritization of remediations can produce advantages in terms of conservation of limited remediation resources. Orchestrator 110 running remediation deployment process 117 can perform scoring of candidate remediations for each of a plurality of respective faults. Scoring of candidate remediations can include use of results of fault impact predicting process 113 and remediation cost predicting process 116. Orchestrator 110 running remediation deployment process 117 can include orchestrator 110 ordering remediations within remediation queue 2125 in dependence on prioritization order determined by remediation deployment process 117. Orchestrator 110 running remediation deployment process 117 can include orchestrator 110 deploying remediations within a computer environment in an order based on the ordering of remediations within remediation queue 2125. Examples of software remediations which can be deployed can include, e.g., spawning one or more new virtual machine (including one or more hypervisor based virtual machine and/or one more container based virtual machine), migrating one or more virtual machine to a new computing node 10 provided by a physical computing node, reprovisioning one or more virtual machine (e.g., by increasing a memory and/or CPU resource allocation to the one or more virtual machine). Examples of hardware remediations which can be deployed can include changing a memory device defining a resource, adding memory to a memory resource, scaling up computing nodes 10 defining pods. Remediations can be differentiated between microservices having respectively differentiated faults.

Figure 2:
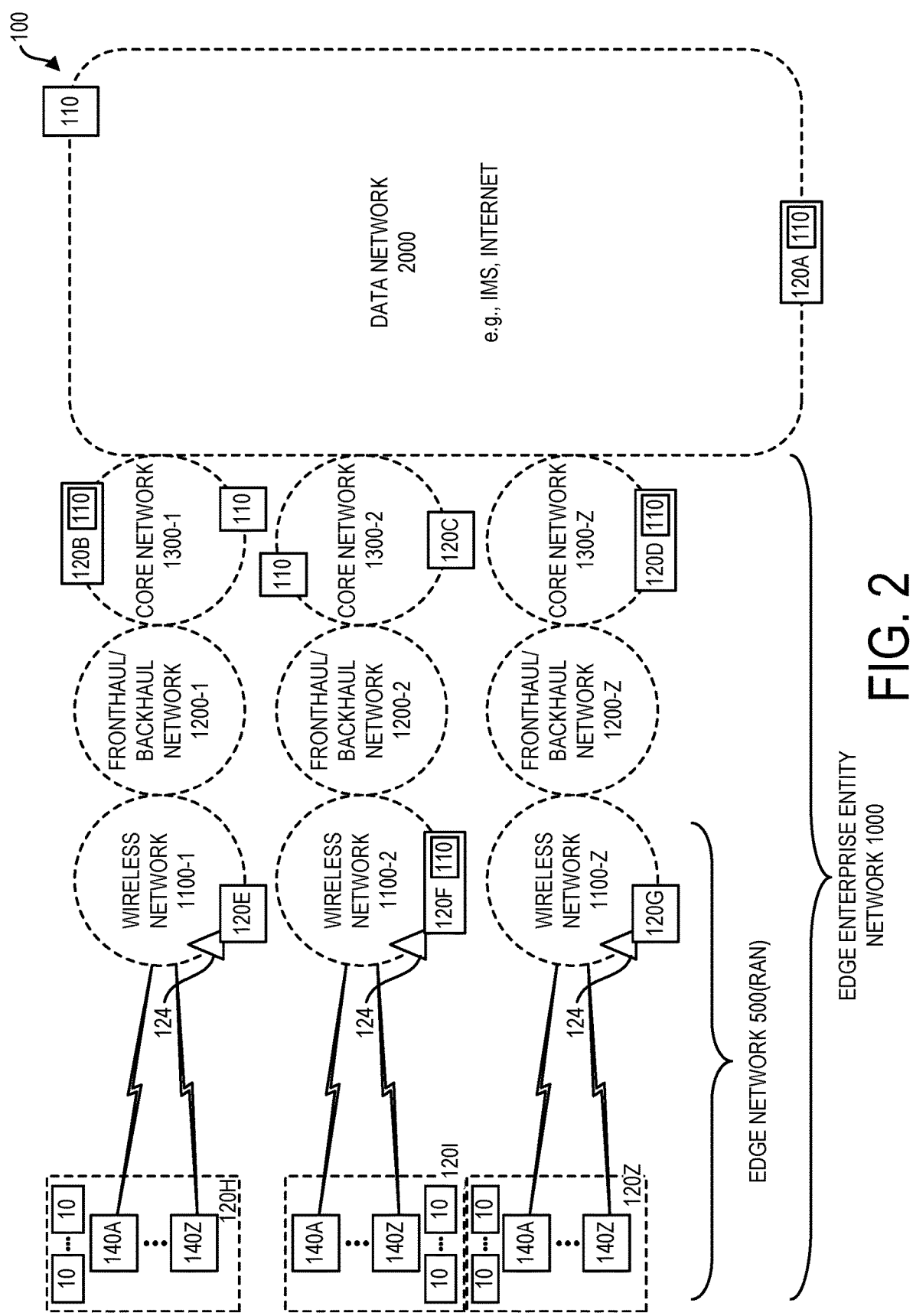
FIG. 2 illustrates a network infrastructure view of the system according to FIG. 1.

FIG. 2 depicts a physical network implementation view of system 100. System 100 can include UE devices 140A-140Z in communication with data network 2000 via a plurality of edge enterprise entity networks 1000. System 100, as set forth herein, including in reference to FIGS. 1 and 2 can be compliant with Fifth Generation (5G) technologies, including the New Radio (NR) standard, documents of 3GPP TS 28.530 V15.1.0 Release 15 by the $3^{rd}$ Generation Partnership Project (3GPP), and the technical reports of Release 16 of the 3GPP (3GPP Release 16 reports).

Respective edge enterprise entity networks 1000 can include edge infrastructure owned, operated, and/or controlled by one or more edge enterprise entity distributed throughout different geospatial regions within a geospatial area. In one embodiment, a certain edge enterprise entity can own, operate, and/or control the edge network infrastructure comprising wireless network 1100-1, fronthaul/backhaul network 1200-1, and core network 1300-1 in a first geospatial region. The certain edge enterprise can own, operate, and/or control the edge infrastructure comprising wireless network 1100-2, fronthaul/backhaul network 1200-2, and core network 1300-2 on a second geospatial region. The certain edge enterprise entity can own, operate, and/or control the edge infrastructure comprising wireless network 1100-Z, fronthaul/backhaul network 1200-Z, and core network 1300-Z in a third geospatial region. In another example, the different edge enterprise entity networks 1000 can be owned, operated, or controlled by different edge enterprise entities. Different respective ones of the edge enterprise entities can be telecommunications network providers which are sometimes referred to as communication service providers (edge enterprise entity CSPs).

In the described embodiment of FIG. 2, the combination of a wireless network and a fronthaul network can define edge network 500 including a radio access network (RAN). Edge network 500 can define edge infrastructure. The depicted RANs provide access from UE devices 140A-140Z to respective core networks. In an alternative embodiment, one or more of edge networks 500 can be provided by a content delivery network (CDN).

Each of the different UE devices 140A-140Z can be associated to a different user, e.g., a customer end user or an enterprise agent user. A UE device of UE devices 140A-140Z, in one embodiment, can be a computing node device provided by a client computer, e.g., a mobile device, e.g., a smartphone or tablet, a laptop, smartwatch, or PC that runs one or more program that facilitates access to services by one or more service provider. A UE device of UE devices 140A-140Z can alternatively be provided by, e.g., an internet of things (IoT) sensing device.

Embodiments herein recognize that hosting service functions on one or more computing node within an edge enterprise entity network 1000 can provide various advantages including latency advantages for speed of service delivery to end users at UE devices 140A-140Z. Edge enterprise entity hosted service functions can be hosted, e.g., within edge network 500 or otherwise within edge enterprise entity network 1000.

Data network 2000 can include, e.g., an IP multimedia sub-system (IMS) and/or "the internet" which can be regarded as the network of networks that consist of private, public, academic, business, and government networks of local to global scope linked by a broad array of electronic, wireless, and optical networking technologies. Data network 2000 can include, e.g., a plurality of non-edge data centers. Such data centers can include private enterprise data centers as well as multi-tenancy data centers provided by IT enterprises that provide for hosting of service functions developed by a plurality of different enterprise entities.

Orchestrator 110, in one embodiment, can be disposed in data network 2000. Orchestrator 110 can additionally or alternately be disposed in core network 1300-1, 1300-2, and 1300-Z, and/or in edge network 500. As shown in FIG. 2, the different computer environments of computer environments 120A-120Z subject to servicing by orchestrator 110 can be disposed, e.g., in data network 2000, core network 1300-1, 1300-2, 1300-3, and/or edge network 500. While system 100 depicts a wireless "last mile" to UE devices 140A-140Z, system 100 can also or alternatively provide a wireline last mile connection to UE devices 140A-140Z.

A method for performance by orchestrator 110 interoperating with computer environment 120A is set forth in reference to the flow diagram of FIG. 3U.

At block 1201, computer environment 120A can be sending logging data for examination by orchestrator 110. Logging data sent at block 1201 can include logging data, e.g., obtained by use of hardware layer logging agents, system-level software logging agents and/or application layer logging agents. Orchestrator 110 on receipt of the described logging data can perform examining of logging data at block 1101. Logging data sent at block 1201 can include time series logging data. In one embodiment, logging data for a certain computer environment can be accumulated by a manager 115 associated to the computer environment being monitored and can be sent by the manager. Logging data sent from individual microservice to a computer environment manager 115 can be tagged with an address of an API endpoint 132 associated to the microservice.

Orchestrator 110 on performing examining at block 1101 can proceed to block 1102. At block 1102 orchestrator 110 can ascertain, based on the examining of logging data at block 1101, whether a fault has been identified. On the identification of a fault at block 1102, orchestrator 110 can perform fault isolation. Fault isolation at block 1102 can include identifying location of a fault within a computer environment. Orchestrator 110 for determining a location of a fault can examine tags of logging data that has been examined for fault detection. In one example, logging data can be tagged with a tag that specifies an API endpoint through which logging data was sent, which tag can specify an address of a microservice. Determining a location of fault can be based on reading of a tag that specifies an API address associated to a microservice.

Examining of logging data for fault detection at block 1101 can include transforming logging data into metrics data and examining the metrics data. Logging data can refer to unstructured data emitted from a logging agent and metrics data can refer to structured data structured from the unstructured logging data. An example of logging data can include: LOG: Nov 15 11:31:05 service X:java.net.SocketException: Connection or outbound has closed. Examples of metrics data can include: METRIC: CURRENT_USER_COUNT=100; METRIC: CURRENT_CPU_LOAD_PERCENT=50. Metrics that are examined for identification of faults can define key performance indicator (KPIs). An example of a microservice KPI that can be examined for fault detection can include, e.g., (a) load (a measurement of how much demand/traffic is on a microservice and is being supported by a microservice. Another example of a microservice KPI that can be examined for fault detection can be (b) latency, which refers response time of a microservice (can be measured in milliseconds). For determination of latency, multiple datapoints over a time period can be aggregated, e.g., averaged. Another example of a microservice KPI that can be examined for fault detection can be (c) error rate. Error rate can be measured in terms of errors per second or as a percentage of the overall number of requests v. the number of requests with error. Another example of a microservice KPI that can be examined for fault detection can be (d) saturation. Saturation can refer to how full the most constrained resources of a microservice are. Another example of a microservice KPI that can be examined for fault detection can be (e) instances. Instances can refer to the number of containers of a microservice that are performing the same function. Another example of a microservice KPI that can be examined for fault detection can include (f) current user count. Another example of a microservice KPI that can be examined for fault detection can include (g) CPU loading. CPU loading can refer to aggregate, e.g., average loading on computing nodes 10 hosting a microservice being monitored by fault detection process 112.

On the detection of a fault by determining that one or more fault criterion has been satisfied, orchestrator 110 can return to a stage prior to examining block 1101 for iterative receipt of additional logging data from components, e.g., microservices of a computer environment being monitored. On the determination at block 1102 that a fault has been identified orchestrator 110 can also return as indicated by the feedback loop of FIG. 3 can also return to a stage preceding block 1101 to reiteratively receive additional logging data. Orchestrator 110, as indicated by the feedback loops of FIG. 3 can iteratively perform blocks 1101 and 1102 throughout a deployment period of orchestrator 110.

On the detection of a fault at block 1102, orchestrator 110 can commence audit trail recording. Audit trail recording of a fault can include iteratively performed blocks 1121, 1122 and 1123. At iterations of examining block 1121 orchestrator 110 can examine metrics defining key performance indicators (KPIs) associated to the detected fault prior to initiation of a remediation, parameters characterizing remediations applied to remediate a fault, and performance KPIs subsequent to initiating a remediation of a fault. When a fault remediation has been deployed for a certain detected fault (block 1202) logging data iteratively sent by a computer environment 120A at block 1201 can be updated to send logging data that specifies a remediation that has been applied for the certain detected fault. At block 1122, orchestrator 110 can ascertain whether audit trail recording has been complete and if not complete, orchestrator 110 can iteratively perform the loop of blocks 1121 and 1122. Ascertaining that an audit trail recording has been complete can include determining that KPI performance parameter values have returned to normal range values. If at block 1122 orchestrator 110 determines that audit trail recording has been complete, orchestrator 110 can proceed to block 1122, orchestrator 110 can report a flag to faults area 2122 specifying that audit trail reporting has been completed.

Orchestrator 110 while branching to perform audit trail recording at blocks 1121-1123 can simultaneously branch to blocks 1103 to perform fault impact predicting by fault impact predicting process 113. Orchestrator 110 at block 1103 can perform evaluating and predicting impact of an identified fault using the formula set forth in Eq. 1.

$$I = IF1W1 + IF2W2 + IF3W3 + IF4W4 \quad \text{(Eq. 1)}$$

Where I is the overall scale (level) of the predicted impact, IF1 is the first impact factor, IF2 is the second impact factor, IF3 is the third impact factor, IF4 is a fourth impact factor and W1, W2, W3, W4 are weights associated to the various impact factors.

In one embodiment, IF1 can be a number of infrastructure components impacted factor, IF2 can be a severity of failure factor, IF3 can be KPI degradation factor and IF4 can be a dependent resources factor, wherein impact on neighboring resources neighboring a resource of a fault is predicted. Where a fault detected is associated to a certain microservice, the factors IF1, IF2, IF3, IF4 can be associated to the certain microservice.

Orchestrator 110 can scale assigned scoring values under factor IF1 in dependence in a number of infrastructure components, e.g. microservice infrastructure components impacted by a fault, e.g., a number of computing nodes 10 provided by physical computing nodes. Orchestrator 110 can scale assigned scoring values under factor IF2 in dependence on a severity of a fault. Orchestrator 110 ascertaining a severity of a fault can include orchestrator 110 classifying a fault and orchestrator 110 assigning scoring values according to the decision data structure of Table A.

TABLE A

| Row | Service effect classification of fault | Scoring value |
| --- | --- | --- |
| 1 | sustained loss of service to customer | 0.9 |
| 2 | transient loss of service to customer | 0.8 |
| 3 | sustained degraded service to customer | 0.7 |
| 4 | transient degraded service to customer | 0.5 |
| 5 | no service degradation to customer | 0.4 |

As shown by Table A, different faults can have different severity levels, and orchestrator 110 can scale scoring values under factor IF3 based on fault classification. The classifications can be ascertained by examining historical KPIs of faults that are nearest neighbor faults of a current fault in order to determine the impact of the nearest neighbor faults. Nearest neighbor faults can be ascertained using clustering analysis set forth in reference to FIG. 4. In reference to FIG. 4, attributes of current fault at A can be plotted against historical faults recorded within data repository. Orchestrator 110 can identify the historical faults within cluster C as nearest neighbor faults of the current fault at A. Orchestrator 110 with the nearest neighbor faults identified, can examine audit trail records (including KPI metrics data) of the nearest neighbor historical faults, in order to ascertain a classification for the impact of the historical nearest neighbor faults (e.g., loss of service to customer, degraded service to customer, no service degradation to customer) for the historical nearest neighbor faults. Results can be aggregated, e.g., averaged for faults within cluster C.

Figure 4:
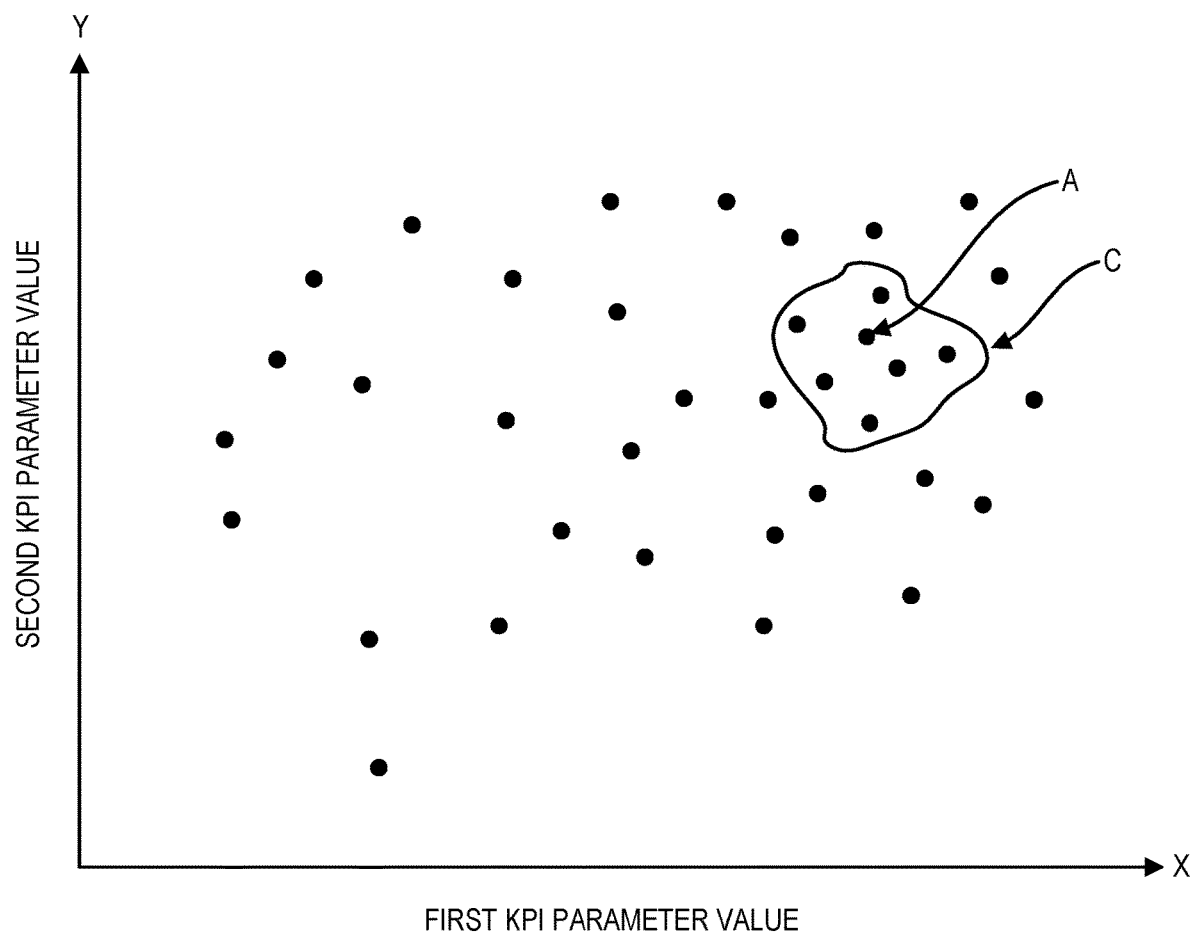
FIG. 4 depicts clustering analysis for identification of candidate remediations according to one embodiment.

In performing clustering analysis as set forth in reference to FIG. 4, orchestrator 110 can examine multiple parameter values (dimensions of a current fault with respect to comparison dimensions of historical faults). The dimensions in one example, can be key performance indicator (KPI) parameter values and/or other attribute parameter values characterizing a fault and/or a component location (e.g., microservice) of a fault. In the clustering analysis diagram of FIG. 4 there are plotted a plurality of data points, each data point representing an historical fault plotted into dimensions, namely a first KPI parameter value dimension and second KPI parameter value dimension. While the clustering analysis depicted in FIG. 4 includes two dimensions, the clustering analysis can be scaled to N dimensions. Dimensions used for clustering analysis in one example as shown in FIG. 4 can include attribute parameter values that characterize a fault other than KPI parameter values. In one example, attribute parameter values that characterize a fault other than KPI parameter values can include attribute values that characterize a microservice in which the fault is located that is associated to the fault. The attribute parameter values can include, e.g., numbers of computing nodes 10 provided by physical computing nodes allocated for the microservice, number of virtual machines, memory capacity associated to the nodes 10 and the like.

Referring to factor IF3, orchestrator 110 can scale assigned scoring values under factor IF3 in dependence on a scale of degradation of one or more KPI parameter value. An example of a microservice KPI that can be examined for fault detection can include, e.g., (a) load (a measurement of how much demand/traffic is on a microservice and is being supported by a microservice. Another example of a microservice KPI that can be examined for fault detection can be (b) latency, which refers response time of a microservice (can be measured in milliseconds). For determination of latency, multiple datapoints over a time period can be aggregated, e.g., averaged. Another example of a microservice KPI that can be examined for fault detection can be (c) error rate. Error rate can be measured in terms of errors per second or as a percentage of the overall number of requests v. the number of requests with error. Another example of a microservice KPI that can be examined for fault detection can be (d) saturation. Saturation can refer to how full the most constrained resources of a microservice are. Another example of a microservice KPI that can be examined for fault detection can be (e) instances. Instances can refer to the number of containers of a microservice that are performing the same function. Another example of a microservice KPI that can be examined for fault detection can include (f) current user count. Another example of a microservice KPI that can be examined for fault detection can include (g) CPU loading. CPU loading can refer to aggregate, e.g., average loading on computing nodes 10 hosting a microservice being monitored by fault detection process 112.

Figure 5:
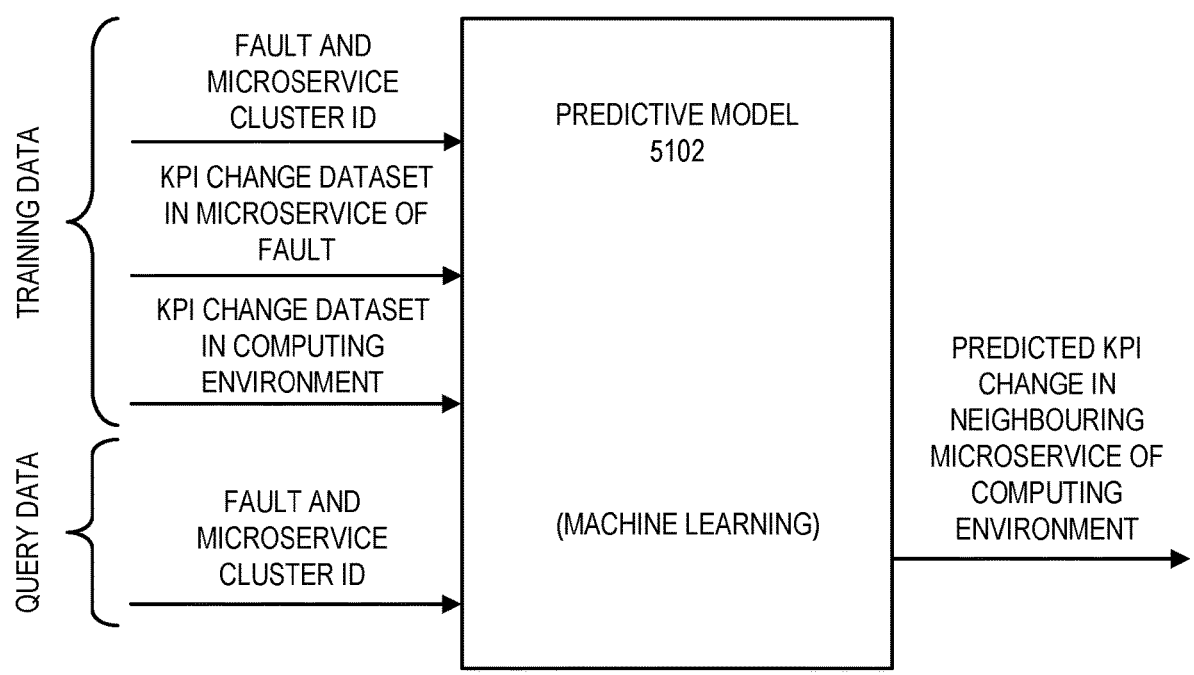
FIG. 5 depicts a predictive model for predicting impact of a fault on neighboring resources according to one embodiment.

Referring to factor IF4 (neighboring resources factor), orchestrator 110 can scale scoring values under factor IF4 using the predictive model 5102 shown in FIG. 5 to predict an impact of a fault on resources neighboring a component location (e.g., microservice) of the fault. In one example, predictive model 5102 can be trained with training data to predict an impact of a fault on resources neighboring a current fault. Predictive model 5102 can be trained with iterations of training data, and once trained, predictive model 5102 can perform predictions as to an impact of a fault within a microservice on neighboring resources. In one example, an iteration of training data for training predictive model 5102 can include (a) a cluster ID specifying an instance of an historical fault and microservice classification, (b) a KPI dataset change for the microservice associated to the fault, and (c) a KPI dataset change for a computer environment external to the fault associated microservice. In regard to (a) in reference to the clustering analysis of FIG. 4 different clusters of faults and associated microservices can be identified and separated into different clusters of similar nearest neighbor faults/microservices. Regarding (b) a time window for a fault (encompassing a time prior to and after initiation of a fault) can be identified, and a dataset can be developed specifying KPI change for the window for the microservice of the fault. Regarding (c) the same time window of (b) can be used and a dataset can be developed specifying KPI change for the window for computer environment microservices in a common computer environment of the fault but external to the microservice of the fault. Training with multiple iterations of the described training data predictive model 5102 can learn a relationship between faults occurring within a microservice of a certain classification and the impact of the fault on neighboring microservices of a common computer environment. For some fault and microservice cluster classifications, computer environment KPIs will not change significantly with microservice KPI changes, and for other fault and microservice classifications, computer environment KPIs will change significantly with microservice KPI changes. By training predictive model 5102 with training data specifying such relationships, predictive model, once trained will be able to predict a change in neighboring microservice KPIs in dependence on a fault classification of a current fault. Query data for querying predictive model 5102 can include fault cluster ID for the currently identified fault. In response to the described query data, predictive model 5102 can output a prediction that specifies an extent to which KPIs of microservices of current computer environment will change based on the occurrence of the currently identified fault. Orchestrator 110 can scale shoring values assigned under factor IF4 in dependence on the described output data of predictive model 5102.

Various available tools, libraries, and/or services can be utilized for implementation of predictive model 5102. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring, and retraining deployed models. According to one possible implementation, a machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring, and retraining deployed models. Predictive model 5102 can employ use of, e.g., support vector machines (SVM), Bayesian networks, neural networks, and/or other machine learning technologies.

On completion of impact predicting block 1103, orchestrator 110 can proceed to generating block 1104. At generating block 1104, orchestrator 110 by remediation generating process 114 can generate a plurality of candidate remediations for the fault detected at block 1102.

For performing generating of a plurality of candidate remediations at block 1104, orchestrator 110 can perform clustering analysis as explained in reference to FIG. 4. In performing clustering analysis orchestrator 110 can examine multiple parameter values (dimensions of a current fault with respect to comparison dimensions of historical faults). The dimensions in one example, can be key performance indicator (KPI) parameter values and/or other attribute parameter values characterizing a fault and/or a component location (e.g., microservice) of a fault. In the clustering analysis diagram of FIG. 4 there are plotted a plurality of data points, each data point representing an historical fault plotted into dimensions, namely a first KPI parameter value dimension and second KPI parameter value dimension. While the clustering analysis depicted in FIG. 4 includes two dimensions, the clustering analysis can be scaled to N dimensions. Dimensions used for clustering analysis in one example as shown in FIG. 4 can include attribute parameter values that characterize a fault other than KPI parameter values. In one example, attribute parameter values that characterize a fault other than KPI parameter values can include attribute values that characterize a microservice in which the fault is located that is associated to the fault. The attribute parameter values can include, e.g., numbers of computing nodes 10 provided by physical computing nodes allocated for the microservice, number of virtual machines, memory capacity associated to the computing nodes 10 and the like. It will be recognized that, as the described processes are iterative, orchestrator 110 at blocks 1103 and 1104 can be iteratively performing fault impact predicting and candidate remediation generating for multiple faults simultaneously and contemporaneously.

The fault represented by A in FIG. 4 can be the current fault detected at block 1102 and orchestrator 110 at generating block 1104 can identify the threshold satisfying nearest neighbor faults within cluster C is the most similar fault for comparison to the current fault. Next, orchestrator 110 can examine respective audit trail records of faults area 2122 for the historical faults represented within cluster C wherein the audit trail records have been produced according to the processing at blocks 1121, 1122 and 1123.

Orchestrator 110 can examine audit trail data of historical remediations performed with respect to the identified historical faults within cluster C. In some use cases, orchestrator 110 can filter out and remove from a candidate remediate set remediations of historical faults where remediations failed to result in one or more criterion indicating success of the remediation being satisfied. In one embodiment success criterion can be based on one or more KPI parameter satisfying the threshold subsequent to implementation of the remediation.

On completion of generating block 1104, orchestrator 110 can proceed to cost predicting block 1105 which can be performed by remediation cost predicting process 116. Orchestrator 110 at block 1105 can include orchestrator 110 performing cost evaluation with respect to each respective candidate remediations generated at generating block 1104.

For performance of remediation cost predicting at block 1105, orchestrator 110 can apply Eq. 2 as follows.

$$C = CF1W1 + CF2W2 + CF3W3 \quad \text{(Eq. 2)}$$

Where C as a predicted level of cost for a candidate remediation being evaluated, CF1, CF2 and CF3 are factors impacting cost of the remediation being evaluated and W1, W2, and W3 are weights associated to the various factors.

CF1 can be a classification factor, CF2 can be a complexity factor, and CF3 can be a neighboring resource factor. Orchestrator 110 according to factor CF1 can scale scoring values assigned under factor F1 with use of the decision data structure of Table B. Referring to Table B various remediations can include classifications, e.g., Sn for software based remediation, Hn for hardware based remediation. Examples of software remediations can include, e.g., spawning one or more new virtual machine (including one or more hypervisor based virtual machine and/or one or more container based virtual machine), migrating one or more virtual machine to a new computing node 10 provided by a physical computing node, reprovisioning one or more virtual machine (e.g., by increasing a memory and/or CPU resource allocation to the one or more virtual machine). Examples of hardware remediations can include changing a memory device defining a resource, adding memory to a memory resource, scaling up computing nodes 10 defining pods. Remediations can be differentiated between microservices having respectively differentiated faults.

TABLE B

| Row | CF1 classification | Scoring value |
|---|---|---|
| 1 | S1 | 0.1 |
| 2 | S2 | 0.3 |
| 3 | S3 | 0.3 |
| 4 | H1 | 0.7 |
| 5 | H2 | 0.7 |
| 6 | H3 | 0.9 |

Referring to the decision data structure of Table B, orchestrator 110 at block 1105 can apply scoring values under factor CF1 using specified baseline scoring values specified in Table A wherein scoring values can be applied in dependence on classification of remediation.

Orchestrator 110 under factor CF2 of Eq. 2 can scale scoring values under factor CF2 in dependence on complexity, wherein more complex remediations are assigned higher scoring values under factor CF2 than less complex remediations. For ascertaining complexity, orchestrator 110 applying factor CF2 of Eq. 2 can examine, e.g., number of steps involved to implement the remediation time taken to perform steps of the respective remediation being evaluated, skill level, e.g., education required to perform the remediation, manuals and/or guides referred to in order to perform the remediation, reading level of agent involved in prior remediations of the like classification and the like. In one aspect, orchestrator 110 can examine data of a Git data repository of an Internet hosting service for determining complexity of a remediation. In one example, orchestrator 110 can examine data of a Git data repository of an Internet hosting service for software development and version control using Git. An Internet hosting service can provide distributed version control of Git plus access control, bug tracking, software feature requests, task management, and continuous integration. Git herein refers to distributed version control system for tracking changes in any set of files, usually used for coordinating work among programmers collaboratively developing source code during software development. Its goals include speed, data integrity, and support for distributed, non-linear workflows (thousands of parallel branches running on different systems). In one example, orchestrator 110 can examine data of a Git data repository in order to ascertain a predicted length of time for implementation of a remediation.

Orchestrator 110 can scale scoring values under factor CF3 of Eq. 2 in dependence on an effect of a remediation. Orchestrator 110 can apply scoring values under factor CF3 with use of the decision data structure of Table B wherein scoring values can be applied in dependence on an effect classification of the remediation. Orchestrator 110 providing effect classifications for candidate remediations can include orchestrator 110 examining audit trail record data for the remediation.

TABLE C

| Row | Service effect classification of remediation | Scoring value |
|---|---|---|
| 1 | loss of service to customer | 0.9 |
| 2 | degraded service to customer | 0.7 |
| 3 | effecting internal testing environment. | 0.3 |

In Table C service effect classifications associated to the remediations are (a) loss of service to customer (b) degraded service to customer and (c) effecting internal testing environment.

On completion of block 1105 orchestrator 110 can proceed to prioritizing block 1106. At prioritizing block 1106 orchestrator 110 can perform prioritizing of candidate remediations generated at block 1104. For performing prioritizing at block 1106, orchestrator 110 can apply Eq. 3 as follows.

$$S = F1W1 + F2W2 \quad \text{(Eq. 3)}$$

Where S is a scoring value applied to a candidate remediation being considered, F1 is a first factor, F2 is a second factor and W1 and W2 are weights associated to the first and second respective factors.

In one embodiment, F1 can be the scoring value resulting from block 1103 (impact predicting) and F2 can be the result of performing block 1105 (remediation cost predicting). Thus, applying Eq. 3, orchestrator 110 can perform scoring of candidate remediations in dependence both on a predicted impact of a fault associated to the remediation (Eq. 1) and the predicted cost associated to the candidate remediation (Eq. 2).

In prioritizing remediations at block 1106, orchestrator 110 can prioritize remediations associated to multiple different faults. The multiple different faults can be faults associated to one or more microservice. In one example, each fault can be associated to a respective microservice. It will be recognized that, as the described processes are iterative, orchestrator 110 at blocks 1105 and 1106 can be iteratively performing fault remediation cost predicting and prioritizing of candidate remediations for multiple faults simultaneously and contemporaneously.

Orchestrator 110 at block 1106 can order remediations in remediation queue 2125 according to the prioritization order determined at block 1106. In one embodiment, the remediations can be ordered according to the scoring values determined using Eq. 3. On completion of prioritizing at block 1106 and ordering of remediations listed in remediation queue 2125, orchestrator 110 can proceed to block 1107. Embodiments herein recognize that there can be limited resources with which to perform remediations. Remediation resources can include, e.g., compute resources for remediation, memory resources for remediation, remediation service resources. Accordingly, prioritization of remediations can produce advantages in terms of conservation of limited remediation resources.

At block 1107, orchestrator 110 can send remediation deployment data for receipt by computer environment 120A. Remediation deployment data can include, e.g., software code to reprovision the resource for installation in the case that remediation includes installation of new software code. Remediation deployment data in another example, can include messages to a manager of computer environment 120A to deploy a specified remediation.

Computer environment 120A on receipt of the remediation deployment data can deploy the remediation at block 1202. Deploying at block 1202 can include, in reference to the described examples, e.g., installation of received software code to reprovision a resource and/or deployment at block 1202 can include computer environment manager acting to implement a remediation.

On completion of block 1107, orchestrator 110 can proceed to return block 1108. At return block 1108, orchestrator 110 can return to a stage preceding block 1103 to perform the depicted branching in the performance of audit trail recording and block 1103 to 1107 processing of a next identified fault.

Orchestrator 110 can iteratively perform the loop of blocks 1103 to 1108 and at return block 1108 orchestrator 110 can return to block preceding block 1101 to examine next received logging data. As noted, orchestrator 110 can iteratively be performing examining at block 1101 and fault identification 1102 during the deployment period of orchestrator 110. Iteratively during a deployment period of orchestrator, orchestrator 110 can further in response to an identified fault be performing audit trail recording as noted with reference to blocks 1121 to 1123 and block 1103 to 1107 processing to prioritize remediation for multiple faults.

When new faults are identified, candidate remediations for such faults can be generated at block 1104 and candidate remediations for new faults can be prioritized at prioritizing block 1106 as they are identified. Based on the prioritizing at block 1106, there can be instances wherein a generated remediation for a newly identified fault can be prioritized higher than a remediation for an earlier identified fault. Thus, later identified faults in some circumstances can be given priority over earlier identified faults and remediations for such faults can be moved to a higher position in remediation queue 2125 and can be deployed earlier than remediations for earlier identified faults. Embodiments herein recognize that there can be limited resources with which to perform remediations. Remediation resources can include, e.g., compute resources for remediation, memory resources for remediation, remediation service resources. Accordingly, prioritization of remediations can produce advantages in terms of conservation of limited remediation resources.

Figure 3:
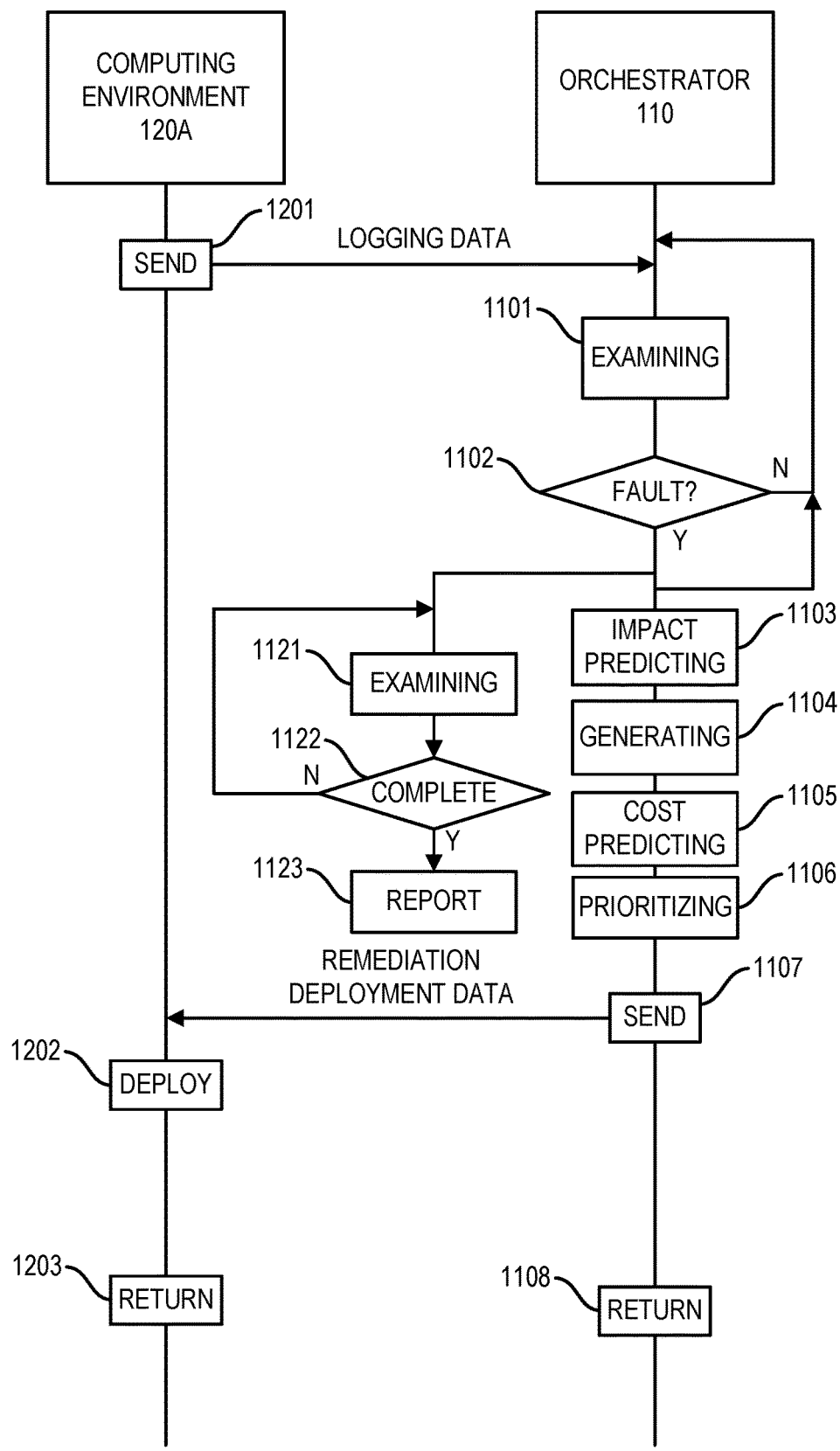
FIG. 3 illustrates a method for performance by an orchestrator interoperating with the computer environment according to one embodiment.

Accordingly, there is set forth herein, with reference to the flowchart of FIG. 3 a method comprising iteratively examining logging data; detecting multiple faults in a computer environment in dependence on the examining of the logging data; generating for respective ones of the detected multiple faults one or more candidate remediation to provide a set of candidate remediations for the computer environment; prioritizing remediations defining the set of candidate remediations from the generating and ordering the remediations in a remediation queue according to an order of the prioritizing; and deploying remediations according to the ordering of remediations in the remediation queue. There is also set forth herein, with reference to the flowchart of FIG. 3, the method wherein the detected multiple faults includes a first fault detected within a first microservice of the computer environment, and wherein a second fault of the detected multiple faults was detected within a second microservice of the computer environment, wherein the remediation queue includes a first remediation having a higher prioritization order than a second remediation and wherein the first remediation is associated to a fault identified later in time than a remediation in a fault associated to the second remediation, wherein the generating to provide the set of candidate remediations includes, for a certain fault of the multiple faults using clustering analysis to identify historical faults having a threshold satisfying level of similarity with the certain fault, wherein the prioritizing the candidate remediations is performed in dependence on a predicted impact of a certain fault of the detected multiple faults, wherein the prioritizing the candidate remediations is performed in dependence on a predicted cost associated to a certain remediation of the candidate remediations, wherein the prioritizing the candidate remediations is performed in dependence on a predicted impact of a certain fault of the detected multiple faults, wherein predicting an impact of the certain fault includes querying a predictive model trained to predict impact of the certain fault on microservices external to a microservice of the certain fault, wherein the predictive model has been trained with iterations of training data which iterations of training data comprise (A) a classifier for a certain microservice of a certain historical fault having a classification in common with the certain fault, (B) a key performance indicator (KPI) dataset that specifies KPI changes of the certain microservice through a time window of the certain historical fault, and (C) a KPI dataset that specifies KPI changes of external microservices external to the certain microservice through the time window of the certain historical fault, wherein the prioritizing the candidate remediations is performed in dependence on a predicted impact of a certain fault of the detected multiple faults, wherein the prioritizing the candidate remediations is performed in dependence on a predicted cost associated to a certain remediation of the candidate remediations, the certain remediation associated to the certain fault, wherein predicting the impact of the certain fault includes evaluating one or more of the following selected from the group consisting of (a) a number of physical computing nodes of a microservice associated to the certain fault, (b) a severity of the fault as determined using a decision data structure wherein severity of fault values are assigned based on fault classification, and wherein fault classification is performed based on impact to customers, (c) a KPI degradation factor, wherein KPIs associated to a microservice of the certain fault are evaluated, and (d) dependent resources factor, wherein impact of the certain fault on neighboring resources neighboring a resources of the certain fault is predicted using a trained predictive model trained by machine learning, wherein predicting cost associated to a certain remediation of the candidate remediations includes evaluating one or more of the following selected from the group consisting of (i) a classification of the certain remediation which specifies the remediation as one of a software based remediation or a hardware based remediation, (ii) a complexity factor, wherein length of time for performance of the certain remediation is ascertained by examining data of a Git data repository, and (iii) an effect factor, wherein an effect of implementing the certain remediation on customers is ascertained, wherein the generating to provide the set of candidate remediations includes, for a certain fault of the multiple faults using clustering analysis to identify historical faults having a threshold satisfying level of similarity with the certain fault, wherein the performing the clustering analysis includes applying first, second and third dimensions describing the certain fault on a clustering map with historical faults obtained from a data repository, identifying a set of historical faults having a threshold level of similarity with the certain fault based on Euclidian distance, and discovering applied remediations applied with respect to the identified set of historical faults, wherein the first dimension describing the certain fault is a first KPI parameter value dimension, wherein the second dimension describing the certain fault is a second KPI parameter value dimension, and wherein the third dimension describing the certain fault is a microservices attributes dimension describing a provisioning attribute of a microservice of the certain fault, wherein the computer environment comprises a plurality of microservices, wherein the deploying remediations according to the ordering of remediations in the remediation queue includes migrating a first virtual machine of a first microservice of the computer environment to a new physical computing node, and reprovisioning a second virtual machine of a second microservice of the computer environment to increase a memory and CPU allocation to the second virtual machine.

Table D below provides examples of faults that can be detected, logging data examined, fault detection criteria, candidate remediations, predicted faulted impact and predicted remediation cost

TABLE D

| Classification of fault | Example logging data and/or metrics data obtained | Characteristics of logging and/or metrics data that trigger fault detection | Candidate remediations that can be generated | Predicted impact and/or predicted remediation cost associated to fault |
|---|---|---|---|---|
| Fault: High CPU load | Event: Fault_Occured { Microservice: A, First_Timestamp: xxxx, Last_timestamp: xxxx, CPU_Consumption: 95% CPU_Limit: 3.0 cores Frequency: 10 | Resource Monitoring on CPU, Memory and Network usage of different components (e.g., microservices) | - Remediation Strategy 1: Assign more CPU to Microservice A (would require restart and/or relocating service to different VM/Physical Machine)<br>- Remediation Strategy 2: Horizontal Scaling: Bring up a replica and load balance some of the incoming requests to $2^{nd}$ replica | Factors to be considered for Fault Cost:<br>- Microservice A is a critical service, and failure of which causes 100% application downtime.<br>- High CPU load might have impact on other co-located services and might cause failure there (nosiy neighbours) |

TABLE D-continued

| Classification of fault | Example logging data and/or metrics data obtained | Characteristics of logging and/or metrics data that trigger fault detection | Candidate remediations that can be generated | Predicted impact and/or predicted remediation cost associated to fault |
|---|---|---|---|---|
| | Node: Virtual_Machine '1' IP: 10.x.x.1 } | | | - Failure in microservice 'A" might result in failures in other dependent microservices, if not immediately fixed. (Cascade Effect, Blast Radius) Factors to consider for Remediation Cost estimation: - Assigning more CPU would require to find an alternate machine that has sufficient CPU left. This would require the migration and might have some downtime. - Alternatively, other co-located microservice can be stripped off some of its CPU and reassignment has to be made on compute resources. - Historical data (past occurrences) suggest that Remediation Strategy 1 only fixes the problem temporarily. |
| Fault: Internal Server Error '500' | Event: Fault_Occured { Microservice: B, First_Timestamp: xxxx, Last_timestamp: xxxx, API_Endpoint: /user/payment Node: Virtual_Machine '2' IP: 10.x.x.3 } | API monitoring (HTTPs Layer 7), e.g., using service mesh like ISTIO Or Logs generated by the service/component | - Remediation Strategy 1: Rolling update (push a newer version of the code/microservice) - Remediation Strategy 2: Disable payment gateway - Remediation Strategy 3: Reroute requests to alternate payment gateway | |
| Fault: Insufficient Memory | Event: Fault_Occured { Microservice: F, First_Timestamp: xxxx, Last_timestamp: xxxx, Memory_Quota: 500MB, Current_Utilisation: 500MB, Failure: Application Crash Core_Dump: abc.dump Node: Virtual_Machine '2' IP: 10.x.x.4 } | Component Core dump analysis, Resource monitoring on memory presume/footprint | - Remediation Strategy 1: Vertical Scaling: Assign more memory to Microservice F and restart - Strategy 2: Horizontal Scaling bring in more replicas of Microservice F and restart | |

Embodiments herein recognize that modern application development and application modernization allow large applications to be built as a collection of loosely coupled microservices. Microservice architecture can allow for improved performance, scalability and manageability However, increased complexities can introduce challenges in respect to addressing issues. Embodiments herein recognize that with multi-components (e.g., including tens to thousands of microservices) based applications, automated closed loop fault management has gained significant attention. Closed loop fault remediation helps minimize the service downtime and faster remediation to failures in an automated way.

However, embodiments herein recognize that dealing with a complex system with multiple simultaneous faults, a fault management system can become easily over burdened. Embodiments herein recognize that there can be limited resources with which to perform remediations. Remediation resources can include, e.g., compute resources for remediation, memory resources for remediation, remediation service resources. Accordingly, prioritization of remediations can produce advantages in terms of conservation of limited remediation resources. Embodiments herein recognize that in a closed loop fault management system, balancing fault impact and remediation cost can include the following: (a) embedding from history of faults and remediations so as to infer a remediation cost function, and (b) rationalizing the remediation steps so as to construct a minimum cost remediation in scenarios where multiple faults occur.

Embodiments herein recognize that with multiple faults occurring simultaneously as can commonly occur in service applications supported by tens to thousands of microservices, there is no way to accommodate the cost of the remediation of a fault. Embodiments herein recognize that currently faults are handled immediately on first in first out (FIFO) basis without distinguishing an impact aspect or a remediation cost aspect.

Embodiments herein recognize that each fault can be characterized as having an associated impact and/or an associated remediation cost in terms of, e.g., the resources used, and time.

Embodiments herein recognize that cost analysis can be useful for determining remediation time and for prioritizing faults for earlier or later remediation. Embodiments herein recognize that cost analysis can also be useful for determining if the actual remediation should be executed or a workaround with less costly remediation should be done. For example, in case of a faulty node (due to hardware failure), a remediation can include migrating a workload to other healthy nodes.

Embodiments herein recognize that cost analysis can include attributes different from attributes of impact analysis. Impact analysis can determine the (potential) damage a fault can cause to an application service's availability. Impact can be measured in terms of service level agreement (SLA) parameters and KPIs.

In one example, a node failure can cause all the running pods to fail, consequently impacting many services running on those pods. There is set forth herein an automated method that can provide trade off between impact of a fault and cost of remediation and which can provide prioritization of the remediations based on the described impact of a fault.

Embodiments herein can provide, for respective faults detected, a methodological real-time cost analysis where cost can be a function of time and resources required for fault diagnosis.

There can be provided a monitoring system used to collect the alerts, whether AIOps diagnosed or otherwise, and which can perform localization of a fault.

Embodiments can provide a remediation type currently being implemented, and can specify whether a workaround is performed to resolve the issue. Embodiments can consider the time required to remediate a fault, e.g., whether a third party service would require specialist access/approval, and monetary cost involved with a fault. Embodiments herein recognize that addressing hardware faults can be costly where a replacement could be required. Embodiments hereon can examine complexity of the remediation, e.g., whether the remediation would require a maintenance time window with some level of service disruption.

Embodiments herein can examine remediation impact on other services, e.g., whether remediation requires moving back to an older version, but that also requires all dependent components to restart.

Embodiments herein can examine skill/expertise required for a remediation. Data of historical remediations having a threshold level of similarity (as measured, e.g., by fault similarity) can inform how long it took to remediate an historical fault, cost and resources involved.

Embodiments herein can include, in response to a fault detection, performing a methodological real-time impact analysis where impact can be a function of, e.g., number of infrastructure components impacted, severity of the failure (partial, transient, etc.), key KPI degradations.

Various methods can be utilized to determine the severity (impact) of a fault. A high impact fault can have low cost remediation or a low impact fault can have high cost remediation.

There is set forth herein, in one aspect, a system and a method for prioritizing fault remediation actions in IT operations management. There can be provided, in one aspect, a list of faults occurring at a given point in time in an IT operations environment. There can be provide, in one aspect, a subsystem for calculating fault remediation costs for each fault. There can be provided, in one aspect, a subsystem for calculating the impact associated with each fault. There can be determined, in one embodiment, impact and fault remediation costs associated with each fault. In one aspect, impact and fault remediation can be traded off to prioritize fault remediation actions.

There is set forth herein a system and a method for prioritizing fault remediation actions in IT Operations Management, which can include: (a) a process to take as input time and resources required for fault diagnosis; (b) a process to take as input remediation type currently being implemented; (c) a process take as input the time required to remediate a fault; (d) a process to take as input complexity of the remediation; (e) a process to take as input effect of the remediation on other services; (f) a process to take as input key expertise required, wherein the above noted inputs are further processed in a subsystem to further prioritize the fault remediation actions.

There can be provided determining time and resources required for fault diagnosis. Determining can analyzing the collaboration platforms such as conversations channels, e.g., Git data repository content. With such processing a system can identify how much time it took to classify a fault alert as transient, intermittent or permanent. Based on the alert type, fault localization can be triggered. Either automated or manual. In case its manual, embodiments can track how many resources were involved in a detection of a fault.

Based on the time spent at each level and resources involved embodiments can compute the predicted cost of a remediation.

Depending upon the alert type (fault type) and service level agreement (SLA), site reliability engineers (SREs) can decide whether to fix the issue with a workaround solution or raise a change request involving developers. For each type of remediation, different cost can be involved. If the remediation is a software fix, e.g., change the version of a microservice to a different version, then certain set of parameters such as SLA parameters related to previous version, compatibility of dependent services with the previous version of the service, can be used determine the cost of the remediation.

If the remediation is a hardware fix, e.g., scaling up the pods or adding more memory to the resource, the factors being considered to compute cost can be different.

Embodiments herein can determine remediation complexity. Determining remediation complexity can include determining number of stages involved to implement the complete remediation, time taken to perform each of the steps, skills required to perform each step of a remediation.

Embodiments can examine, e.g., what all manuals/guides are referred to perform a step, past similar cases, agents involved in performing the steps. Using the above parameters, embodiments can predict complexity level of each remediation step.

Embodiments herein can predict effect of remediation on dependent resources. Depending upon the criticality of the current service being fixed, embodiments herein can determine an effect of a remediation on the neighboring/depending services. For example, in one aspect, a fault remediation might not directly effect the end customers, but it might effect the internal testing environment or other non-critical services. Embodiments herein can examine downtime involved in a remediation and factor downtime in a determination of remediation cost.

Figure 6:
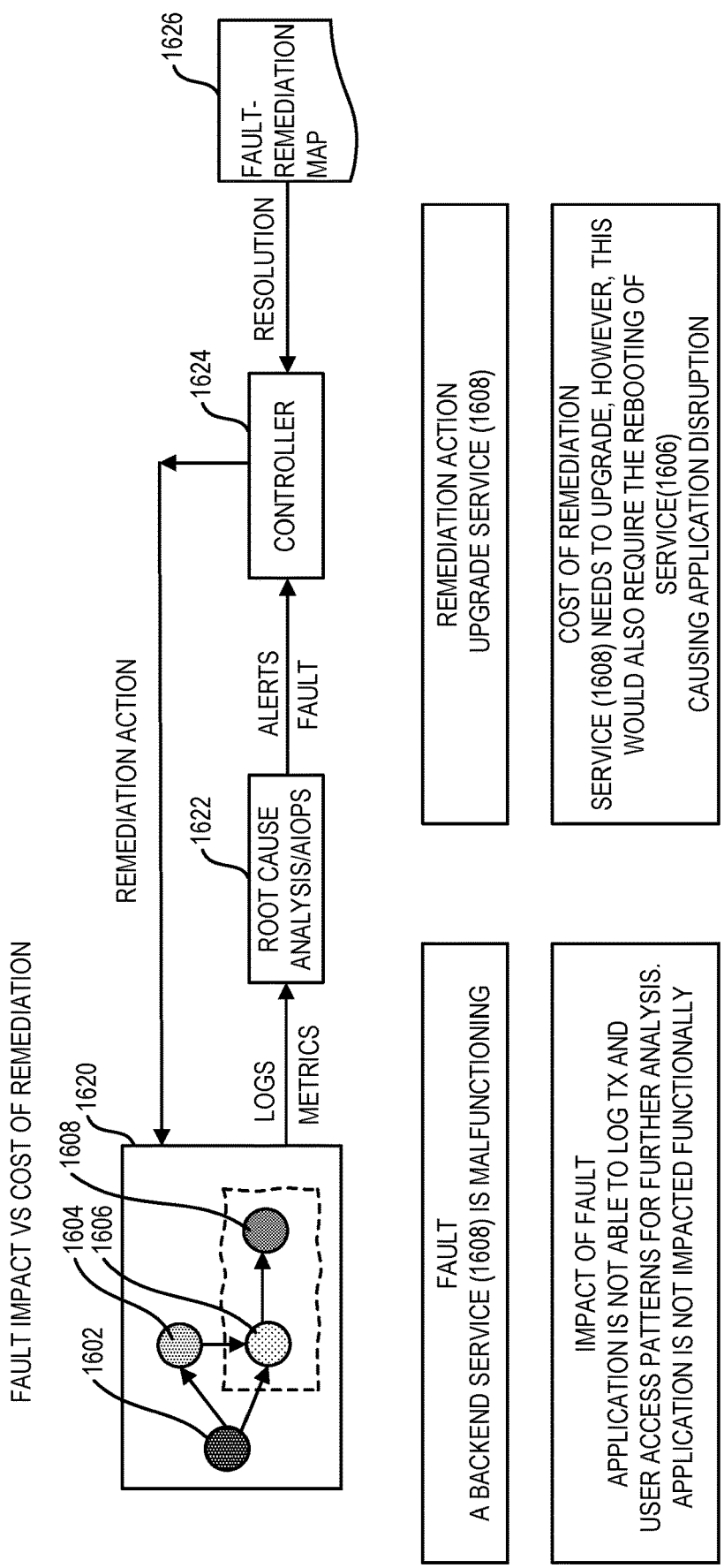
FIG. 6 is a flowchart illustrating remediation operation according to one embodiment.
Figure 7:
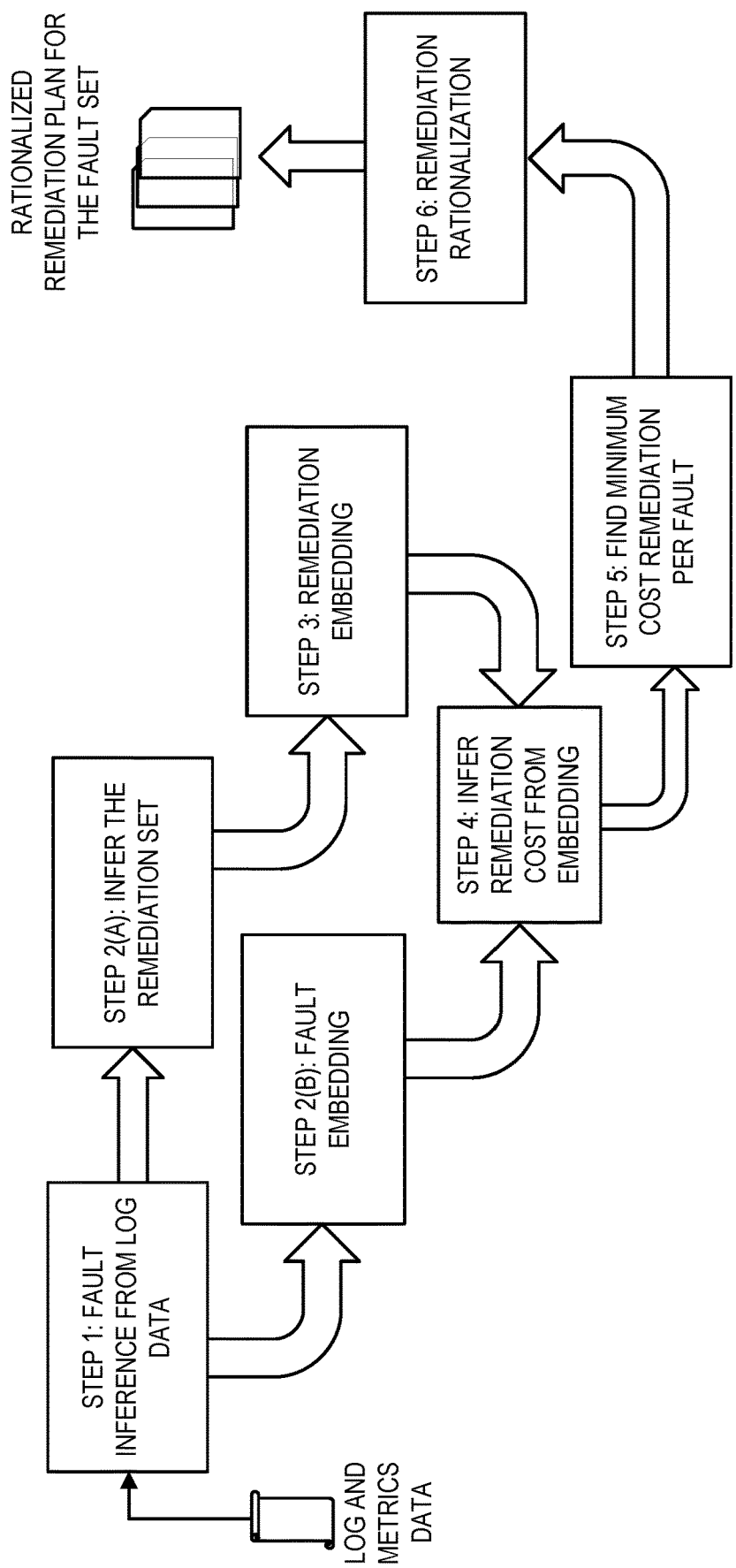
FIG. 7 is a flowchart depicting faults embedding according to one embodiment.

In FIG. 6 there is shown a flowchart depicting tradeoff between fault impact and remediation cost. At block 1620 there is depicted a computer environment with microservices 1602-1608 in communication with one another. Microservices 1602-1608 can define a service application. In one scenario a fault can be detected in microservice 1608 of microservices 1602-1608. Microservice 1608 can be a microservice for performing a backend operation according to one example. Logging data can be sent to a system (e.g., orchestrator 110) for performing examining of logging data (block 1622). An alert can be generated on detection of a fault. Candidate remediations can be prioritized using a controller 1624 and fault remediation map 1626 (which can be incorporated as part of orchestrator 110). A selected remediation can be deployed on computer environment (block 1620). In the described example of FIG. 6, orchestrator 110 can consider both impacts of a detected fault and costs of candidate remediations. In one example, as depicted in FIG. 6, the impact if a detected fault can be that an application defined by a microservice in which the fault is detected is not able to log transaction and user access patterns, but the application is not impacted functionality. In one example, as depicted in FIG. 6, multiple microservices can be affected based on a candidate remediation being evaluated. In one scenario, a candidate remediation for selection can include upgrading microservice 1608. However, in one example, upgrading microservice 1608 can effect microservice 1606 by requiring rebooting of a microservice 1606 in communication with microservice 1608, In reference to FIG. 7, embodiments herein can include at (1)—Fault inference from log data: In this stage, the faults are inferred from log data using existing background art. At 2(A) there can be performed inferring the resolution set: In this step, the various resolution strategies to address the fault are enumerated. This can also be performed using existing background art. At 2(B) there can be performed fault embedding: In this step, the fault description is vectorized and mapped to an embedding space. This space groups similar faults together. At (3) there can be performed resolution (Remediation) embedding: In this stage, the resolution or remediation description can be vectorized and mapped to an embedding space. This space groups similar resolutions together. At (4) there can be performed inferring remediation cost from embedding: In this stage, the remediation cost can be inferred by breaking the remediation into atomic steps and computing their costs from the database of previous cost estimates of such steps. The resolution strategy's cost will be the aggregate of the costs of such atomic steps. At (5) there can be performed finding minimum cost resolution per fault: In this stage, the remediation with least cost can be estimated using the costs from the previous steps. At (6) there can be performed remediation rationalization: When there are multiple faults which require enforcement of remediation overlapping in time, there can be performed identifying common atomic steps (from (4) between the remediation, and such common remediations can be applied only once.

Figure 8:
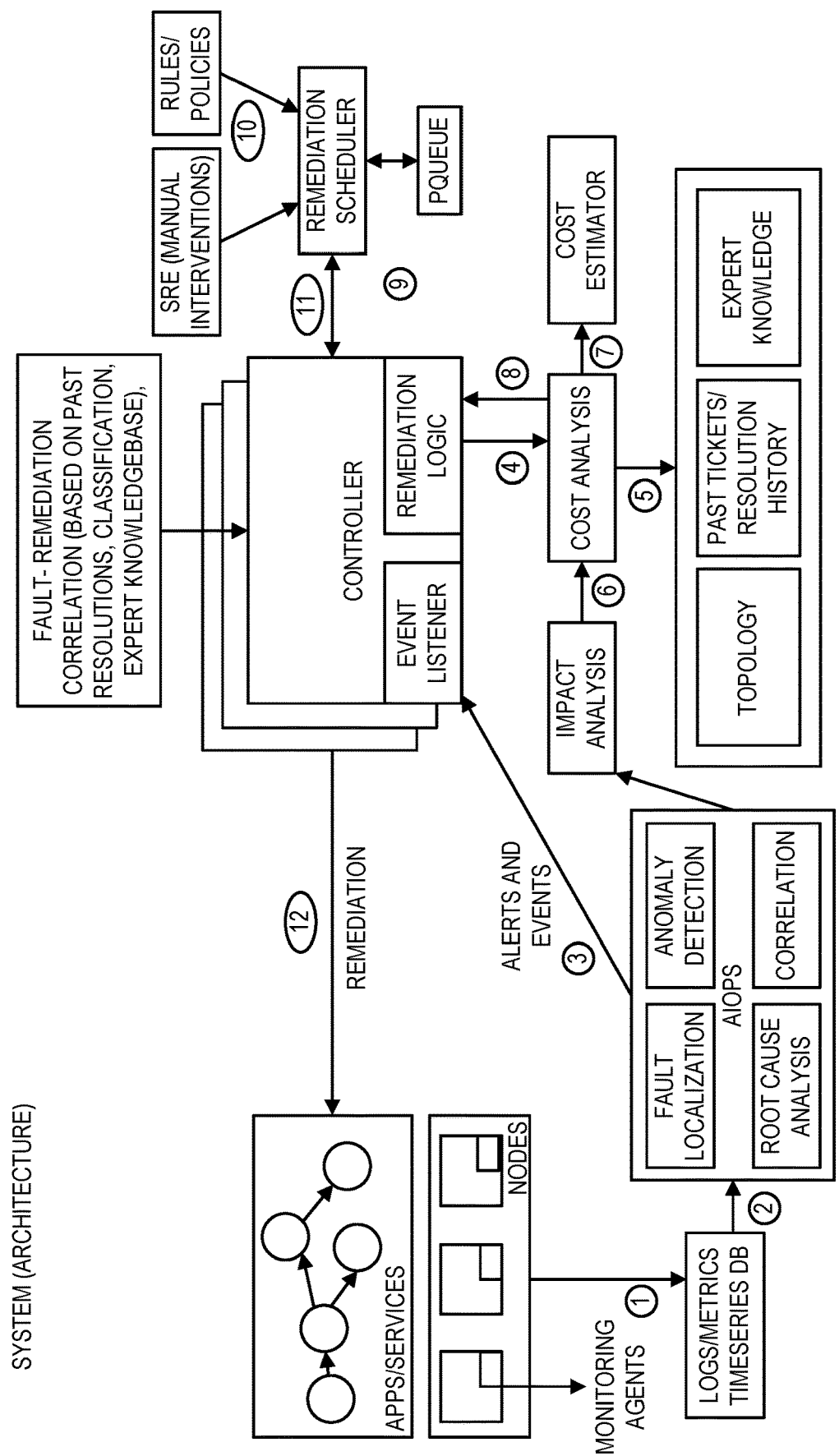
FIG. 8 is a schematic block diagram illustrating a system for remediation of computer environment faults according to one embodiment.

There can be performed the following with reference to FIG. 8. At (1) logs and metrics can be monitored. At (2) raw logs/metrics can be fetched from a time series DB. At (3) an AIOps system can perform analysis and fault F can be generated for a controller. At (4) the controller can run the remediation logic and determine the remediation R and send {F,R} to a cost analysis module. At (5) a cost analysis module (CAM) gets input such as topology information, past fault and resolution and expert knowledgebase information. At (6) the CAM gets the impact of a fault F. At (7) the CAM calculates the cost for {F,R} where the cost C for R=f(time taken, resource involved, service outage . . . ). At (8) the controller receives the cost C for F. At (9) the controller can sends{F,R,C} to a remediation scheduler. At (10) the remediation scheduler can determine the priorities and order for the fault-resolution {F,R} using, e.g., the manual interventions or using rules/policies. At (11) the remediation scheduler can notify the controller for the remediation. At (12) the remediation can be performed.

Figure 9:
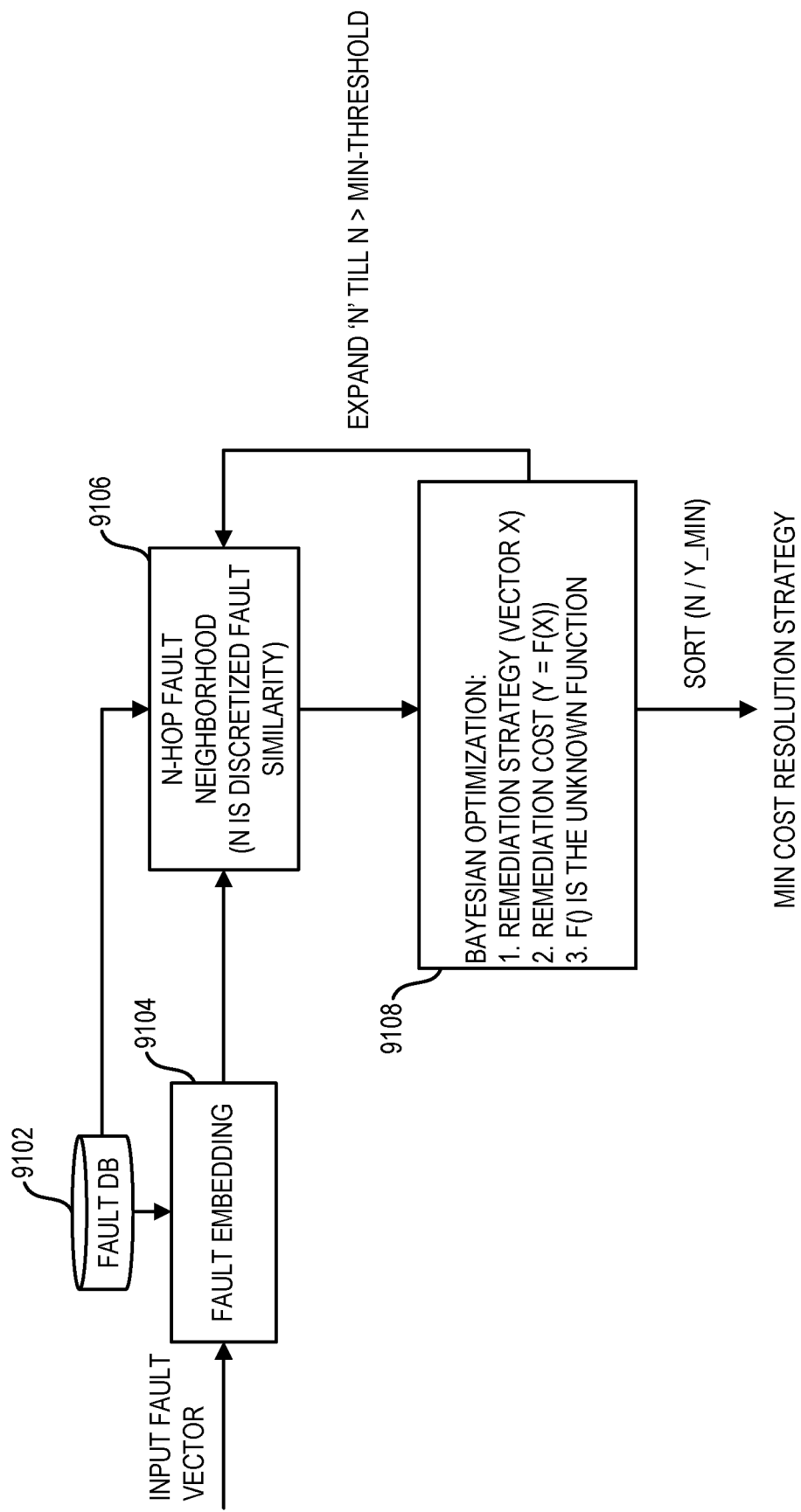
FIG. 9 is a flowchart depicting determination of minimal cost resolution strategy according to one embodiment.

In reference to the flowchart of FIG. 9, fault embedding can be performed at block 9104. At block 9106 a fault neighborhood can be ascertained using N-hop analysis. At block 9108 Bayesian optimization can be utilized for evaluation of candidate remediations, for extraction of a lowest cost remediation.

Figure 10:
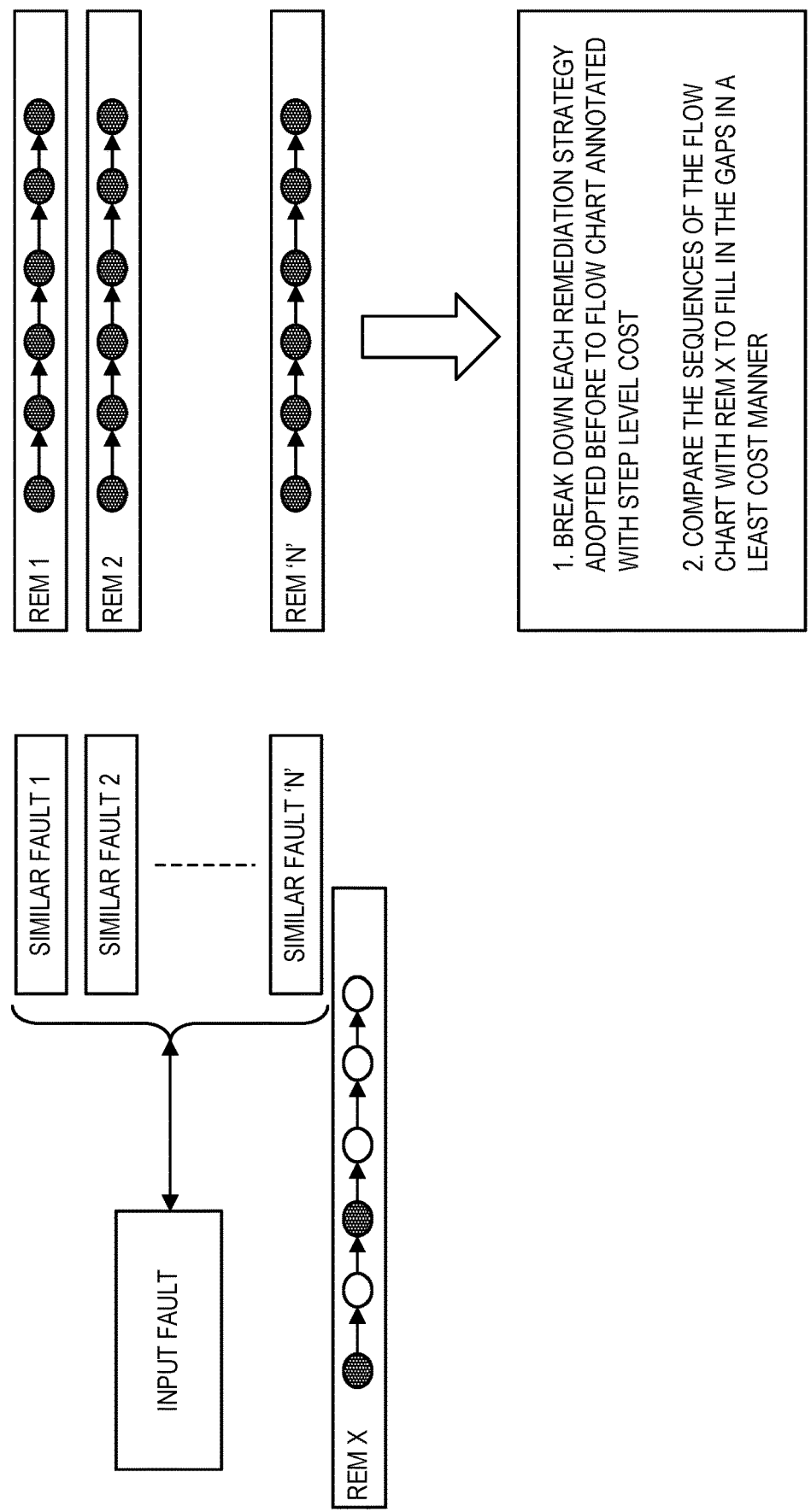
FIG. 10 is a diagram illustrating a modular approach to cost resolution according to one embodiment.

In one embodiment, as shown in FIG. 10, there can be performed fault and remediation vectorization into atomic steps and creating an embedding to estimate the cost of remediation strategies. There can be performed rationalization of the remediation strategies by identifying the common atomic steps to reduce the remediation cost of fault remediations overlapping in time.

Certain embodiments herein may offer various technical computing advantages involving computing advantages to address problems arising in the realm of computer systems and networks. Embodiments herein can improve performance of computer system provided by computer environment by monitoring performance of a computer system to detect faults, automatically generating candidate remediations for detected multiple faults, prioritizing candidate remediations, and deploying remediations according the order of remediations determined according to the prioritizing. Embodiments can include ordering remediations in a remediation queue according to an order of the prioritizing, and deploying remediations according to the ordering of remediations. In one example, deploying remediations according to the ordering of remediations in the remediation queue can include migrating a first virtual machine of a first microservice of the computer environment to a new physical computing node, and reprovisioning a second virtual machine of a second microservice of the computer environment to increase a memory and CPU allocation to the second virtual machine. Embodiments herein can provide for intelligent and systematic remediation of faults in a computer environment. Embodiments herein can provide for fault detection in a computer environment, generation of candidate remediations for such faults and prioritization of the generated candidate remediations. Embodiments herein recognize that there can be limited resources with which to perform remediations. Remediation resources can include, e.g., compute resources for remediation, memory resources for remediation, remediation service resources. Accordingly, prioritization of remediations can produce advantages in terms of conservation of limited remediation resources. Generated remediations can be placed in a queue wherein remediations are positioned in the queue in an order determined according to prioritization ordering in which multiple factors can be considered. In the prioritization of remediations an orchestrator can examine, e.g., both an impact of a fault and cost for candidate remediations for remediation of the fault. For the generation of candidate remediations, currently identified faults can be compared to historical faults with use of clustering analysis to identify nearest neighboring faults. An audit trail report can be used to identify remediations associated to prior historical faults. For providing an audit trail record, an audit trail can be commenced when each new fault is identified. An orchestrator can record in an audit trail associated to a fault, KPI parameter values characterizing the fault prior to remediation, parameter values specifying attributes of an applied remediation, and KPI parameter values characterizing the fault subsequent to initiating remediation. An orchestrator can use an audit trail recording for multiple purposes. For example, for generating candidate remediations, an orchestrator can identify historical remediations applied for addressing historical faults associated to a current fault. In another aspect, an orchestrator can examine KPI parameter values associated to prior remediations recorded in an audit trail in order to determine an effect associated to a remediation of a certain classification. In another aspect, an orchestrator can train a predictive model using audit trail data. In one example, a predictive model can be a predictive model for predicting an impact of a fault within a certain microservices on microservices within a computer environment external to the certain microservice. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 11:
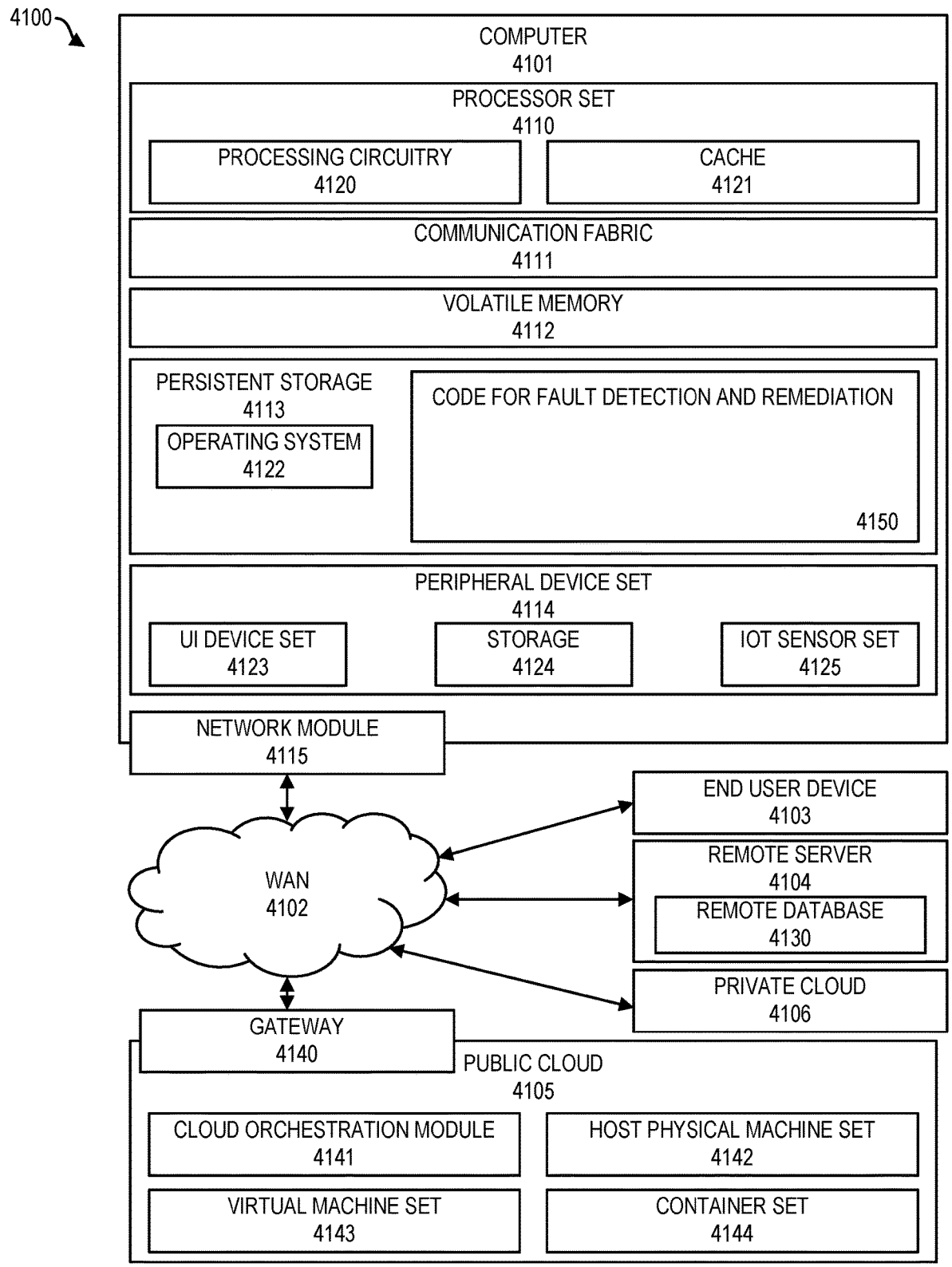
FIG. 11 depicts a computing environment according to one embodiment.

In reference to FIG. 11 there is set forth a description of a computing environment 4000 that can include one or more computer 4101. In one example, computing node 10 as set forth herein can be provided in accordance with computer 4101 as set forth in FIG. 11.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 4100 contains an example of an environment for the execution of at least some of the computer code involved in performing the inventive methods, such as code for fault detection and remediation 4150, functionality of which is described with reference to methods of FIGS. 1-10 set forth herein. In addition to block 4150, computing environment 4100 includes, for example, computer 4101, wide area network (WAN) 4102, end user device (EUD) 4103, remote server 4104, public cloud 4105, and private cloud 4106. In this embodiment, computer 4101 includes processor set 4110 (including processing circuitry 4120 and cache 4121), communication fabric 4111, volatile memory 4112, persistent storage 4113 (including operating system 4122 and block 4150, as identified above), peripheral device set 4114 (including user interface (UI) device set 4123, storage 4124, and Internet of Things (IoT) sensor set 4125), and network module 4115. Remote server 4104 includes remote database 4130. Public cloud 4105 includes gateway 4140, cloud orchestration module 4141, host physical machine set 4142, virtual machine set 4143, and container set 4144. Sensor set 4125, in one example, can include a Global Positioning Sensor (GPS) device, one or more of a camera, a gyroscope, a temperature sensor, a humidity sensor, a pulse sensor, a blood pressure (bp) sensor or an audio input device.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, computing node 10 and can include one or more program 40 for performing functions set forth in reference to FIGS. 1-13. In one embodiment, orchestrator 110 can include one or more computing node 10 and can include one or more program 40 for performing functions described with reference to orchestrator 110 as set forth in the flowchart of FIG. 3. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 11 computing node 10 is described as being implemented in a cloud computing environment and accordingly is referred to as a cloud computing node in the context of FIG. 11.

Computer 4101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 4130. As is well understood in the art of computer technology, and depending upon the technology, performance of a computer-implemented method may be distributed among multiple computers and/or between multiple locations. On the other hand, in this presentation of computing environment 4100, detailed discussion is focused on a single computer, specifically computer 4101, to keep the presentation as simple as possible. Computer 4101 may be located in a cloud, even though it is not shown in a cloud in FIG. 1. On the other hand, computer 4101 is not required to be in a cloud except to any extent as may be affirmatively indicated.

Processor set 4110 includes one, or more, computer processors of any type now known or to be developed in the future. Processing circuitry 4120 may be distributed over multiple packages, for example, multiple, coordinated integrated circuit chips. Processing circuitry 4120 may implement multiple processor threads and/or multiple processor cores. Cache 4121 is memory that is located in the processor chip package(s) and is typically used for data or code that should be available for rapid access by the threads or cores running on processor set 4110. Cache memories are typically organized into multiple levels depending upon relative proximity to the processing circuitry. Alternatively, some, or all, of the cache for the processor set may be located "off chip." In some computing environments, processor set 4110 may be designed for working with qubits and performing quantum computing.

Computer readable program instructions are typically loaded onto computer 4101 to cause a series of operational steps to be performed by processor set 4110 of computer 4101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 4121 and the other storage media discussed below. The program instructions, and associated data, are accessed by processor set 4110 to control and direct performance of the inventive methods. In computing environment 4100, at least some of the instructions for performing the inventive methods may be stored in block 4150 in persistent storage 4113.

Communication fabric 4111 is the signal conduction paths that allow the various components of computer 4101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 4112 is any type of volatile memory now known or to be developed in the future. Examples include dynamic type random access memory (RAM) or static type RAM. Typically, the volatile memory is characterized by random access, but this is not required unless affirmatively indicated. In computer 4101, the volatile memory 4112 is located in a single package and is internal to computer 4101, but, alternatively or additionally, the volatile memory may be distributed over multiple packages and/or located externally with respect to computer 4101.

Persistent storage 4113 is any form of non-volatile storage for computers that is now known or to be developed in the future. The non-volatility of this storage means that the stored data is maintained regardless of whether power is being supplied to computer 4101 and/or directly to persistent storage 4113. Persistent storage 4113 may be a read only memory (ROM), but typically at least a portion of the persistent storage allows writing of data, deletion of data and re-writing of data. Some familiar forms of persistent storage include magnetic disks and solid state storage devices. Operating system 4122 may take several forms, such as various known proprietary operating systems or open source Portable Operating System Interface-type operating systems that employ a kernel. The code included in block 4150 typically includes at least some of the computer code involved in performing the inventive methods.

Peripheral device set 4114 includes the set of peripheral devices of computer 4101. Data communication connections between the peripheral devices and the other components of computer 4101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 4123 may include components such as a display screen, speaker, microphone, wearable devices (such as goggles and smart watches), keyboard, mouse, printer, touchpad, game controllers, and haptic devices. Storage 4124 is external storage, such as an external hard drive, or insertable storage, such as an SD card. Storage 4124 may be persistent and/or volatile. In some embodiments, storage 4124 may take the form of a quantum computing storage device for storing data in the form of qubits. In embodiments where computer 4101 is required to have a large amount of storage (for example, where computer 4101 locally stores and manages a large database) then this storage may be provided by peripheral storage devices designed for storing very large amounts of data, such as a storage area network (SAN) that is shared by multiple, geographically distributed computers. IoT sensor set 4125 is made up of sensors that can be used in Internet of Things applications. For example, one sensor may be a thermometer and another sensor may be a motion detector.

Network module 4115 is the collection of computer software, hardware, and firmware that allows computer 4101 to communicate with other computers through WAN 4102. Network module 4115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 4115 are performed on the same physical hardware device. In other embodiments (for example, embodiments that utilize software-defined networking (SDN)), the control functions and the forwarding functions of network module 4115 are performed on physically separate devices, such that the control functions manage several different network hardware devices. Computer readable program instructions for performing the inventive methods can typically be downloaded to computer 4101 from an external computer or external storage device through a network adapter card or network interface included in network module 4115.

WAN 4102 is any wide area network (for example, the internet) capable of communicating computer data over non-local distances by any technology for communicating computer data, now known or to be developed in the future. In some embodiments, the WAN 4102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 4103 is any computer system that is used and controlled by an end user (for example, a customer of an enterprise that operates computer 4101), and may take any of the forms discussed above in connection with computer 4101. EUD 4103 typically receives helpful and useful data from the operations of computer 4101. For example, in a hypothetical case where computer 4101 is designed to provide a recommendation to an end user, this recommendation would typically be communicated from network module 4115 of computer 4101 through WAN 4102 to EUD 4103. In this way, EUD 4103 can display, or otherwise present, the recommendation to an end user. In some embodiments, EUD 4103 may be a client device, such as thin client, heavy client, mainframe computer, desktop computer and so on.

Remote server 4104 is any computer system that serves at least some data and/or functionality to computer 4101. Remote server 4104 may be controlled and used by the same entity that operates computer 4101. Remote server 4104 represents the machine(s) that collect and store helpful and useful data for use by other computers, such as computer 4101. For example, in a hypothetical case where computer 4101 is designed and programmed to provide a recommendation based on historical data, then this historical data may be provided to computer 4101 from remote database 4130 of remote server 4104.

Public cloud 4105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 4105 is performed by the computer hardware and/or software of cloud orchestration module 4141. The computing resources provided by public cloud 4105 are typically implemented by virtual computing environments that run on various computers making up the computers of host physical machine set 4142, which is the universe of physical computers in and/or available to public cloud 4105. The virtual computing environments (VCEs) typically take the form of virtual machines from virtual machine set 4143 and/or containers from container set 4144. It is understood that these VCEs may be stored as images and may be transferred among and between the various physical machine hosts, either as images or after instantiation of the VCE. Cloud orchestration module 4141 manages the transfer and storage of images, deploys new instantiations of VCEs and manages active instantiations of VCE deployments. Gateway 4140 is the collection of computer software, hardware, and firmware that allows public cloud 4105 to communicate through WAN 4102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 4106 is similar to public cloud 4105, except that the computing resources are only available for use by a single enterprise. While private cloud 4106 is depicted as being in communication with WAN 4102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 4105 and private cloud 4106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   iteratively examining logging data;
   detecting multiple faults in a computer environment in dependence on the examining of the logging data;
   generating for respective ones of the detected multiple faults one or more candidate remediation to provide a set of candidate remediations for the computer environment;
   prioritizing remediations defining the set of candidate remediations from the generating and ordering the remediations defining the set of candidate remediations in a remediation queue according to an order of the prioritizing; and
   deploying fault remediations according to the ordering of the remediations defining the set of candidate remediations in the remediation queue, wherein the prioritizing the candidate remediations is performed in dependence on a predicted impact of a certain fault of the detected multiple faults, wherein predicting an impact of the certain fault is in dependence on historical data that comprises key performance indicator (KPI) dataset that specifies KPI changes of a certain microservice through a time window of a certain historical fault.

2. The computer implemented method of claim 1, wherein the remediation queue includes a first remediation having a higher prioritization order than a second remediation and wherein the first remediation is associated to a fault identified later in time than a fault associated to the second remediation.

3. The computer implemented method of claim 1, wherein the computer environment comprises a plurality of microservices, wherein the deploying remediations according to the ordering of remediations in the remediation queue includes migrating a first virtual machine of a first microservice of the computer environment to a new physical computing node, and reprovisioning a second virtual machine of a second microservice of the computer environment to increase a memory and CPU allocation to the second virtual machine.

4. The computer implemented method of claim 1, wherein predicting an impact of the certain fault includes querying a predictive model trained to predict impact of the certain fault on microservices external to a microservice of the certain fault, wherein the predictive model has been trained with iterations of training data which iterations of training data comprise (a) a classifier for a certain microservice of a certain historical fault having a classification in common with the certain fault, (b) a key performance indicator (KPI) dataset that specifies KPI changes of the certain microservice through a time window of the certain historical fault, and (c) a KPI dataset that specifies KPI changes of external microservices external to the certain microservice through the time window of the certain historical fault.

5. The computer implemented method of claim 1, wherein the prioritizing the candidate remediations is performed in dependence on a predicted cost associated to a certain remediation of the candidate remediations, the certain remediation associated to the certain fault, wherein predicting the impact of the certain fault includes evaluating a plurality of factors including (a) a number of physical computing nodes of a microservice associated to the certain fault, (b) a severity of the certain fault as determined using a decision data structure wherein severity of fault values are assigned based on fault classification, and wherein fault classification is performed based on impact to customers, (c) a key performance indicator (KPI) degradation factor, wherein KPIs associated to a microservice of the certain fault are evaluated, and (d) dependent resources factor, wherein impact of the certain fault on neighboring resources neighboring a resource of the certain fault is predicted using a trained predictive model trained by machine learning, wherein predicting cost associated to a certain remediation of the candidate remediations includes evaluating one or more of the following selected from the group consisting of (i) a classification of the certain remediation which specifies the certain remediation as one of a software based remediation or a hardware based remediation, (ii) a complexity factor, wherein length of time for performance of the certain remediation is ascertained by examining data of a Git data repository, and (iii) an effect factor, wherein an effect of implementing the certain remediation on customers is ascertained.

6. The computer implemented method of claim 1, wherein the generating to provide the set of candidate remediations includes, for the certain fault of the detected multiple faults using clustering analysis to identify historical faults having a threshold satisfying level of similarity with the certain fault, wherein the performing the clustering analysis includes applying multiple dimensions describing the certain fault on a clustering map with historical faults obtained from a data repository, identifying a set of historical faults having a threshold level of similarity with the certain fault based on Euclidian distance, and discovering applied remediations applied with respect to the identified set of historical faults.

7. The computer implemented method of claim 1, wherein the generating to provide the set of candidate remediations includes, for the certain fault of the detected multiple faults using clustering analysis to identify historical faults having a threshold satisfying level of similarity with the certain fault, wherein the performing the clustering analysis includes applying first, second and third dimensions describing the certain fault on a clustering map with historical faults obtained from a data repository, identifying a set of historical faults having a threshold level of similarity with the certain fault based on Euclidian distance, and discovering applied remediations applied with respect to the identified set of historical faults, wherein the first dimension describing the certain fault is a first key performance indicator (KPI) parameter value dimension, wherein the second dimension describing the certain fault is a second KPI parameter value dimension, and wherein the third dimension describing the certain fault is a microservices attributes dimension describing a provisioning attribute of a microservice of the certain fault.

8. The computer implemented method of claim 1, wherein the generating to provide the set of candidate remediations includes, for the certain fault of the detected multiple faults using clustering analysis to identify historical faults having a threshold satisfying level of similarity with the certain fault, wherein the prioritizing the candidate remediations is performed in dependence on a predicted cost associated to a certain remediation of the candidate remediations.

9. The computer implemented method of claim 1, wherein the detected multiple faults include a first fault detected within a first microservice of the computer environment, and wherein a second fault of the detected multiple faults was detected within a second microservice of the computer environment, wherein the remediation queue includes a first remediation having a higher prioritization order than a second remediation and wherein the first remediation is associated to a fault identified later in time than a fault associated to the second remediation, wherein the generating to provide the set of candidate remediations includes, for the certain fault of the detected multiple faults using clustering analysis to identify historical faults having a threshold satisfying level of similarity with the certain fault, wherein the prioritizing the candidate remediations is performed in dependence on a predicted cost associated to a certain remediation of the candidate remediations.

10. The computer implemented method of claim 1, wherein the detected multiple faults include a first fault detected within a first microservice of the computer environment, and wherein a second fault of the detected multiple faults was detected within a second microservice of the computer environment, wherein the remediation queue includes a first remediation having a higher prioritization order than a second remediation and wherein the first remediation is associated to a fault identified later in time than a fault associated to the second remediation, wherein the generating to provide the set of candidate remediations includes, for the certain fault of the detected multiple faults using clustering analysis to identify historical faults having a threshold satisfying level of similarity with the certain fault, wherein the prioritizing the candidate remediations is performed in dependence on a predicted impact of the certain fault of the detected multiple faults, wherein the prioritizing the candidate remediations is performed in dependence on a predicted cost associated to a certain remediation of the candidate remediations, wherein the prioritizing the candidate remediations is performed in dependence on a predicted impact of the certain fault of the detected multiple faults, wherein predicting an impact of the certain fault includes querying a predictive model trained to predict impact of the certain fault on microservices external to a microservice of the certain fault, wherein the predictive model has been trained with iterations of training data which iterations of training data comprise (A) a classifier for a certain microservice of a certain historical fault having a classification in common with the certain fault, (B) a key performance indicator (KPI) dataset that specifies KPI changes of the certain microservice through a time window of the certain historical fault, and (C) a KPI dataset that specifies KPI changes of external microservices external to the certain microservice through the time window of the certain historical fault, wherein the prioritizing the candidate remediations is performed in dependence on a predicted impact of the certain fault of the detected multiple faults, wherein the prioritizing the candidate remediations is performed in dependence on a predicted cost associated to a certain remediation of the candidate remediations, the certain remediation associated to the certain fault, wherein predicting the impact of the certain fault includes evaluating one or more of the following selected from the group consisting of (a) a number of physical computing nodes of a microservice associated to the certain fault, (b) a severity of the fault as determined using a decision data structure wherein severity of fault values are assigned based on fault classification, and wherein fault classification is performed based on impact to customers, (c) a KPI degradation factor, wherein KPIs associated to a microservice of the certain fault are evaluated, and (d) dependent resources factor, wherein impact of the certain fault on neighboring resources neighboring a resource of the certain fault is predicted using a trained predictive model trained by machine learning, wherein predicting cost associated to a certain remediation of the candidate remediations includes evaluating one or more of the following selected from the group consisting of (i) a classification of the certain remediation which specifies the remediation as one of a software based remediation or a hardware based remediation, (ii) a complexity factor, wherein length of time for performance of the certain remediation is ascertained by examining data of a Git data repository, and (iii) an effect factor, wherein an effect of implementing the certain remediation on customers is ascertained, wherein the generating to provide the set of candidate remediations includes, for the certain fault of the multiple faults using clustering analysis to identify historical faults having a threshold satisfying level of similarity with the certain fault, wherein the performing the clustering analysis includes applying first, second and third dimensions describing the certain fault on a clustering map with historical faults obtained from a data repository, identifying a set of historical faults having a threshold level of similarity with the certain fault based on Euclidian distance, and discovering applied remediations applied with respect to the identified set of historical faults, wherein the first dimension describing the certain fault is a first KPI parameter value dimension, wherein the second dimension describing the certain fault is a second KPI parameter value dimension, and wherein the third dimension describing the certain fault is a microservices attributes dimension describing a provisioning attribute of a microservice of the certain fault, wherein the computer environment comprises a plurality of microservices, wherein the deploying remediations according to the ordering of remediations in the remediation queue includes migrating a first virtual machine of a first microservice of the computer environment to a new physical computing node, and reprovisioning a second virtual machine of a second microservice of the computer environment to increase a memory and CPU allocation to the second virtual machine.

11. The computer implemented method of claim 1, wherein predicting an impact of the certain fault includes querying a predictive model trained to predict impact of the certain fault on microservices external to a microservice of the certain fault, wherein the predictive model has been trained with iterations of training data which iterations of training data comprise a key performance indicator (KPI) dataset that specifies KPI changes of a certain microservice through a time window of a certain historical fault.

12. The computer implemented method of claim 1, wherein predicting the impact of the certain fault includes evaluating a plurality of factors including (a) a key performance indicator (KPI) degradation factor, wherein KPIs associated to a microservice of the certain fault are evaluated, and (b) a dependent resources factor, wherein impact of the certain fault on neighboring resources neighboring a resources of the certain fault is predicted using a trained predictive model trained by machine learning.

13. The computer implemented method of claim 1, wherein predicting the impact of the certain fault includes evaluating a plurality of factors including (a) a key performance indicator (KPI) degradation factor, wherein KPIs associated to a microservice of the certain fault are evaluated, and (b) a dependent resources factor, wherein impact of the certain fault on neighboring resources neighboring a resource of the certain fault is predicted.

14. The computer implemented method of claim 1, wherein predicting the impact of the certain fault includes evaluating a key performance indicator (KPI) degradation factor, wherein KPIs associated to a microservice of the certain fault are evaluated.

15. The computer implemented method of claim 1, wherein predicting the impact of the certain fault includes evaluating a dependent resources factor, wherein impact of the certain fault on neighboring resources neighboring a resource of the certain fault is predicted.

16. The computer implemented method of claim 1, wherein the remediation queue includes a first remediation having a higher prioritization order than a second remediation and wherein the first remediation is associated to a first fault identified later in time than a second fault associated to the second remediation, and wherein the deploying the fault remediations according to the ordering of the remediations defining the set of candidate remediations in the remediation queue includes, prior to deploying the second remediation, deploying the first remediation associated to the first fault identified later in time than the second fault associated to the second remediation.

17. The computer implemented method of claim 1, wherein predicting the impact of the certain fault includes evaluating a dependent resources factor, wherein impact of the certain fault on at least one neighboring resource neighboring one or more resource of the certain fault is predicted.

18. A system comprising:
a memory;
at least one processor in communication with the memory; and
program instructions executable by one or more processor via the memory to perform a method comprising:
iteratively examining logging data;
detecting multiple faults in a computer environment in dependence on the examining of the logging data;
generating for respective ones of the detected multiple faults one or more candidate remediation to provide a set of candidate remediations for the computer environment;
prioritizing remediations defining the set of candidate remediations from the generating and ordering the remediations defining the set of candidate remediations in a remediation queue according to an order of the prioritizing; and deploying fault remediations according to the ordering of the remediations defining the set of candidate remediations in the remediation queue, wherein the prioritizing the candidate remediations is performed in dependence on a predicted impact of a certain fault of the detected multiple faults, wherein predicting an impact of the certain fault is in dependence on historical data that comprises key performance indicator (KPI) dataset that specifies KPI changes of a certain microservice through a time window of a certain historical fault.

19. A computer program product comprising:
a computer readable storage medium readable by one or more processing circuit and storing instructions for execution by one or more processor for performing a method comprising:
iteratively examining logging data;
detecting multiple faults in a computer environment in dependence on the examining of the logging data;
generating for respective ones of the detected multiple faults one or more candidate remediation to provide a set of candidate remediations for the computer environment;
prioritizing remediations defining the set of candidate remediations from the generating and ordering the remediations defining the set of candidate remediations in a remediation queue according to an order of the prioritizing; and deploying fault remediations according to the ordering of the remediations defining the set of candidate remediations in the remediation queue, wherein the prioritizing the candidate remediations is performed in dependence on a predicted impact of a certain fault of the detected multiple faults, wherein predicting an impact of the certain fault is in dependence on historical data that comprises key performance indicator (KPI) dataset that specifies KPI changes of a certain microservice through a time window of a certain historical fault.

\* \* \* \* \*